(12) United States Patent
Woodall et al.

(10) Patent No.: US 7,440,157 B2
(45) Date of Patent: Oct. 21, 2008

(54) OPTICALLY ADDRESSED SPATIAL LIGHT MODULATOR AND METHOD

(75) Inventors: Jerry M. Woodall, Westpoint, IN (US); Jonathan A. Sachs, Vancouver, WA (US)

(73) Assignee: Fury Technologies Corporation, Vancouver, WA (US)

( * ) Notice: Subject to any disclaimer, the term of this patent is extended or adjusted under 35 U.S.C. 154(b) by 0 days.

(21) Appl. No.: 11/713,773

(22) Filed: Mar. 2, 2007

(65) Prior Publication Data

US 2007/0216985 A1 Sep. 20, 2007

Related U.S. Application Data

(60) Provisional application No. 60/778,704, filed on Mar. 2, 2006.

(51) Int. Cl.
G02F 1/03 (2006.01)
G02F 1/135 (2006.01)
H01L 29/06 (2006.01)

(52) U.S. Cl. .................. 359/245; 359/256; 257/21; 349/25; 349/29; 349/30

(58) Field of Classification Search .......... 359/245, 359/246, 250, 252, 254, 256; 257/21, 24, 257/25, 184; 349/25, 29, 30
See application file for complete search history.

(56) References Cited

U.S. PATENT DOCUMENTS

| | | | |
|---|---|---|---|
| 4,197,119 A | 4/1980 | Sadamatsu et al. | 430/55 |
| 4,619,501 A | 10/1986 | Armitage | 350/386 |
| 5,084,777 A | 1/1992 | Slobodin | 359/67 |
| 5,153,761 A * | 10/1992 | Marlor | 349/25 |
| 5,309,262 A | 5/1994 | Haas | 359/67 |
| 5,371,399 A | 12/1994 | Burroughes et al. | 257/451 |
| 5,508,829 A | 4/1996 | Freeouf et al. | 359/3 |

(Continued)

FOREIGN PATENT DOCUMENTS

WO WO 2005/116719 A2 12/2005

OTHER PUBLICATIONS

Beard, T.D., et al., "AC Liquid-Crystal Light Valve", Feb. 1, 1972, Appl. Phys. Lett. vol. 22, No. 3, 3 pgs.

(Continued)

*Primary Examiner*—William C Choi
*Assistant Examiner*—Jack Dinh
(74) *Attorney, Agent, or Firm*—Harrington & Smith, PC

(57) ABSTRACT

An optical device has an electrically insulating first barrier layer disposed over a first electrode layer, a photoconductive layer disposed over the first barrier layer, and a carrier confining layer disposed over the photoconducting layer. The carrier confining layer defines a volume throughout which a plurality of carrier traps are dispersed. Further, an electrically insulating second barrier layer is disposed over the carrier confining layer, a light blocking layer is disposed over the second barrier layer for blocking light of a selected wavelength band. A reflective layer is disposed over the light blocking layer for reflecting light within the selected wavelength band, a birefringent or dispersive layer is disposed over the reflective layer, and an optically transmissive second electrode layer is disposed over the birefringent or dispersive layer. A method is also disclosed, as are additional layers intervening between those detailed above.

31 Claims, 13 Drawing Sheets

U.S. PATENT DOCUMENTS

| | | | | |
|---|---|---|---|---|
| 5,637,883 | A * | 6/1997 | Bowman et al. | 257/21 |
| 6,025,950 | A | 2/2000 | Tayebati et al. | 359/244 |
| 6,528,827 | B2 | 3/2003 | Henning | 257/187 |
| 6,549,254 | B1 | 4/2003 | Grupp et al. | 349/115 |
| 6,771,410 | B1 | 8/2004 | Bourlanoff et al. | 359/248 |
| 7,092,046 | B2 * | 8/2006 | Feoktistov et al. | 349/25 |
| 2002/0149557 | A1 | 10/2002 | Goetz et al. | 345/100 |
| 2002/0196264 | A1 | 12/2002 | Goetz | 345/611 |

OTHER PUBLICATIONS

Fraas, L.M., et al., "AC Photoresponse of a Large-Area Imaging CdS/CdTe Heterojunction", Feb. 2, 1976, Journal of Applied Physics, vol. 47, No. 2, pp. 584-590.

Akiyama, K, et al., "Photoaddresed Spatial Light Modulator using Transmissive and Highly Photosensitive Amorphous-Silicon Carbide Film", Nov. 10, 1993, Applied Optics, vol. 32, No. 32.

Hebbron, M.C., et al., "Development of Gallium Arsenide-Based Spatial Light Modulators", 1987, SPIE vol. 825, Spatial Light Modulators Apps. II, pp. 19-23.

Armitage, D., et al., "Photoaddressed Liquid-Crystal Spatial Light Modulators", 1988, Optical Society of America, pp. 7-10.

Dumarevskii, Y.D., et al., "Metal-Insulator-Semiconductor-Liquid Crystal Structures, Influence of Parameters of Control Signals on Characteristics of Spatial Modulation of Light", May 18, 1983, PNLebedev Physics Institute, Academy of Sciences of the USSR, Moscow, 4 pgs.

Armitage, D., et al., "Photoaddressed Liquid Crystal Edge-Enhancing Spatial Light Modulator", Jan. 15, 1989, Applied Optics, vol. 28, No. 2, 7 pgs.

Armitage, D., et al., "Photoaddressed Liquid Crystal Spatial Light Modulators", Nov. 15, 1989, Applied Optics, vol. 28, No. 22, pp. 4763-4771.

Bleha, W.P., "Progress in Liquid Crystal Light Valves", Oct. 1983, Laser Focus/Electro-Optics, pp. 111-120.

Efron, U., et al., "The Silicon Liquid-Crystal Light Valve", Feb. 15, 1985, J. Appl. Phys. vol. 57, No. 4, pp. 1356-1368.

Hebbron, M.C., "An Investigation Into Galiium Arsenide Liquid Crystal Light Valves", 1996, The Department of Physics Joule Laboratory, 204 pgs.

* cited by examiner

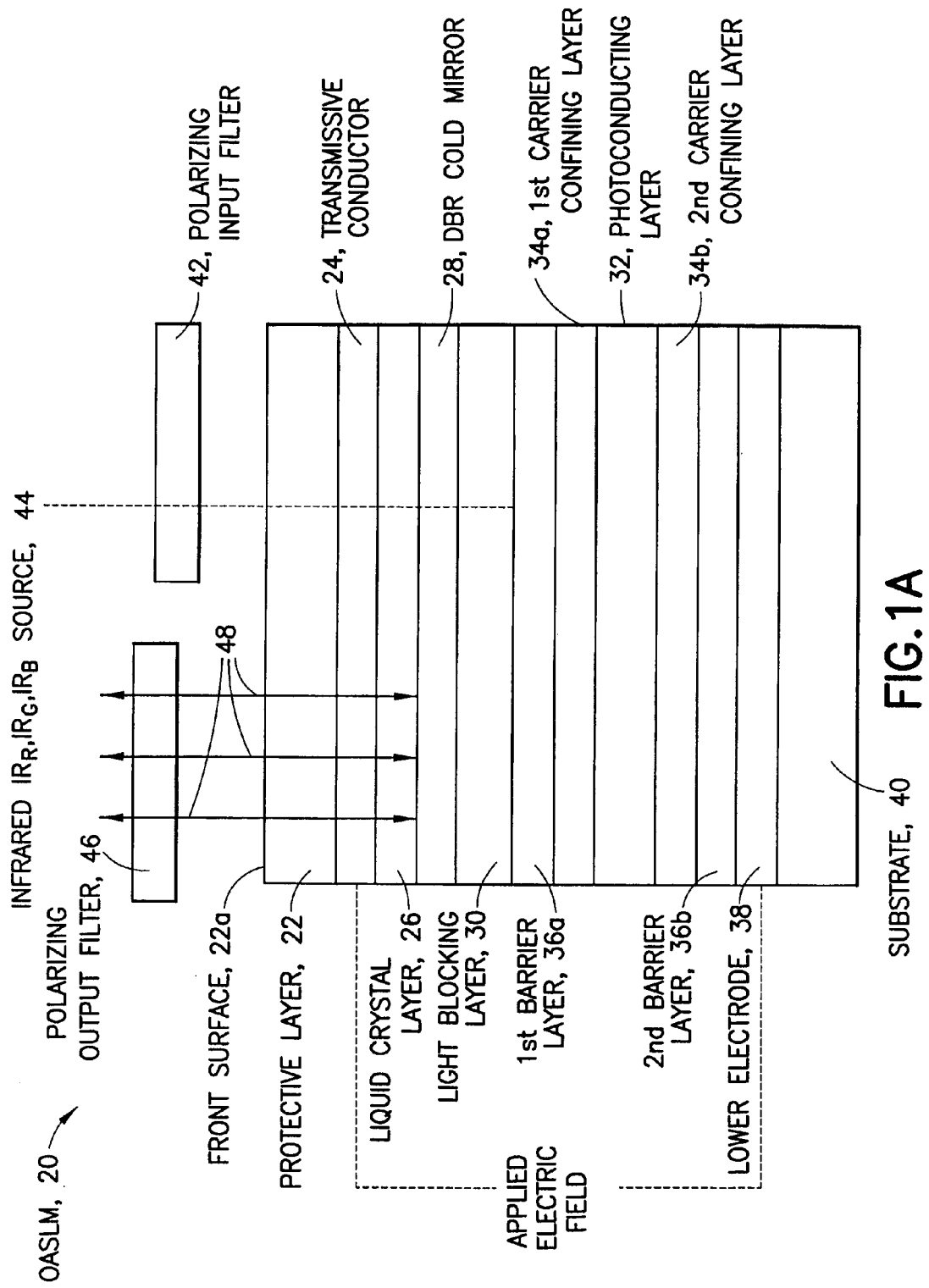

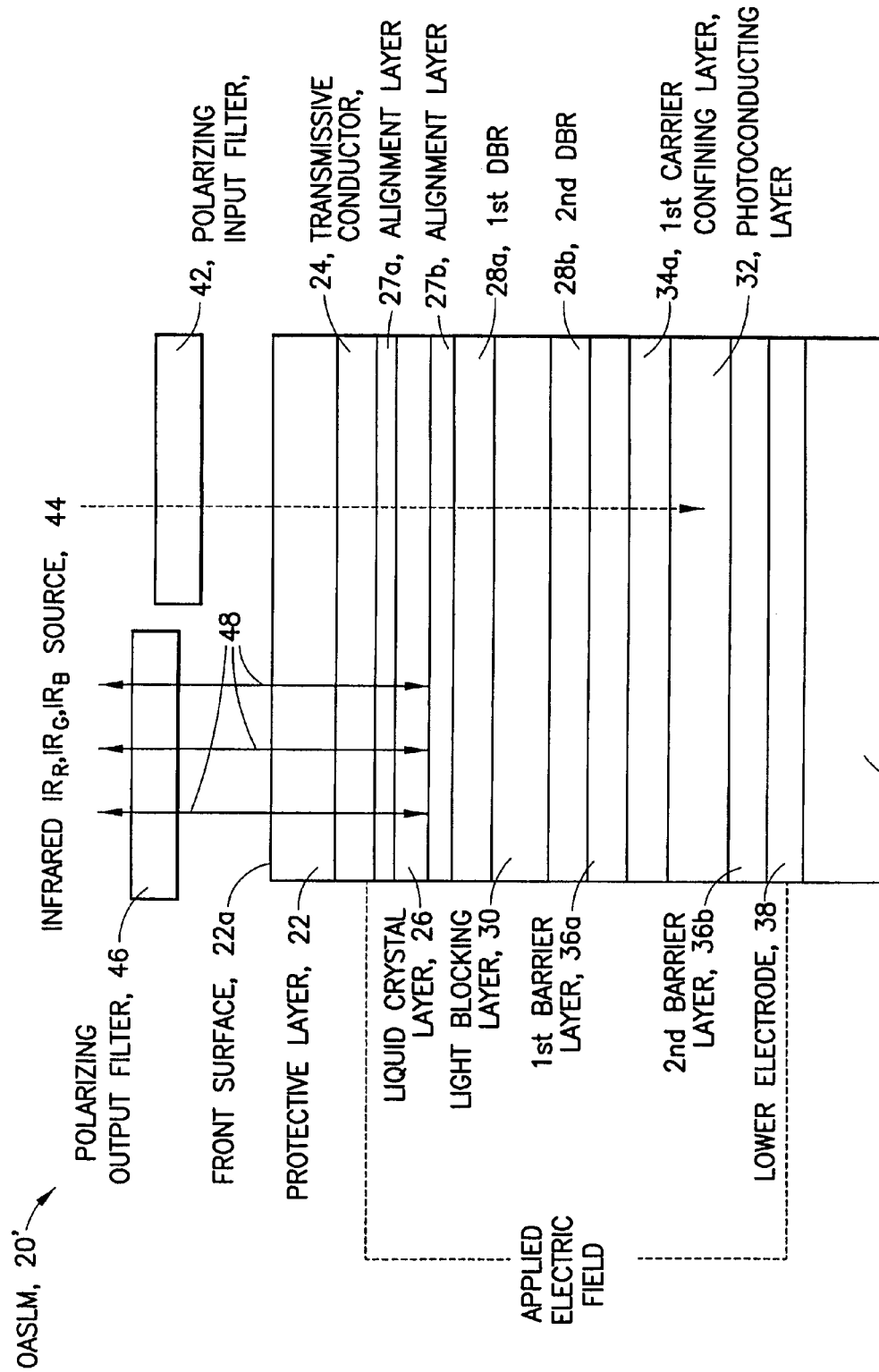

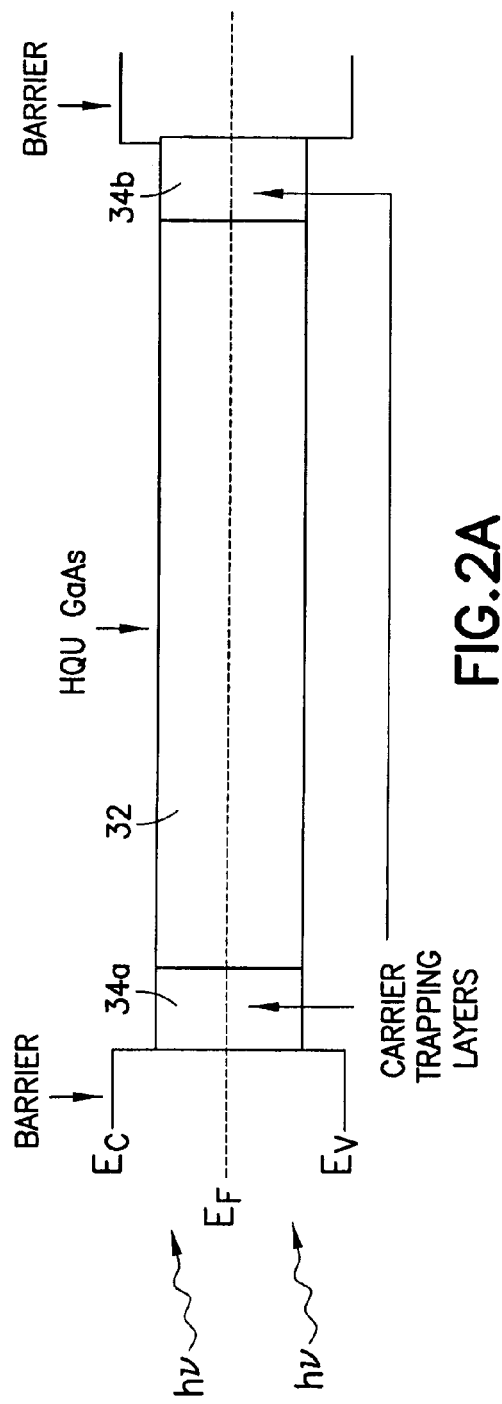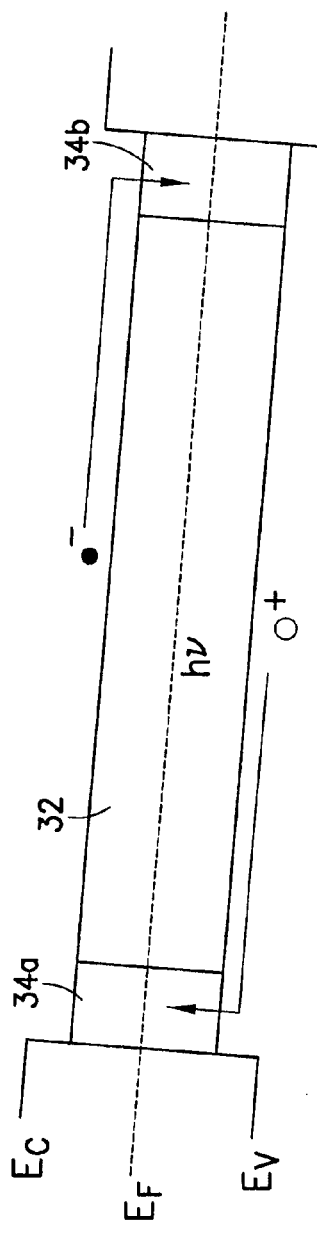
FIG.2A
FIG.2B

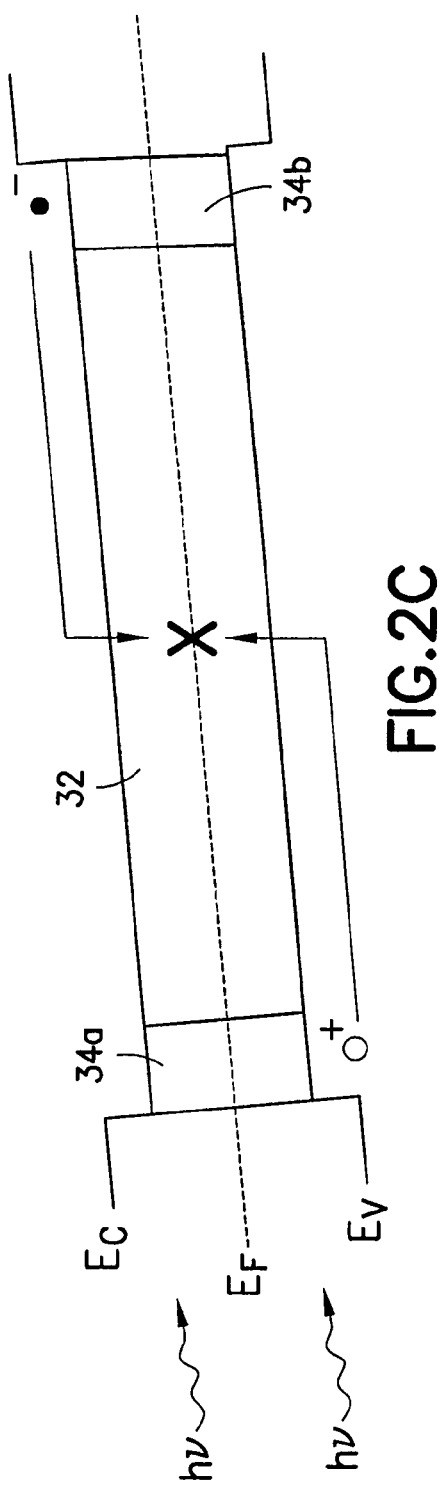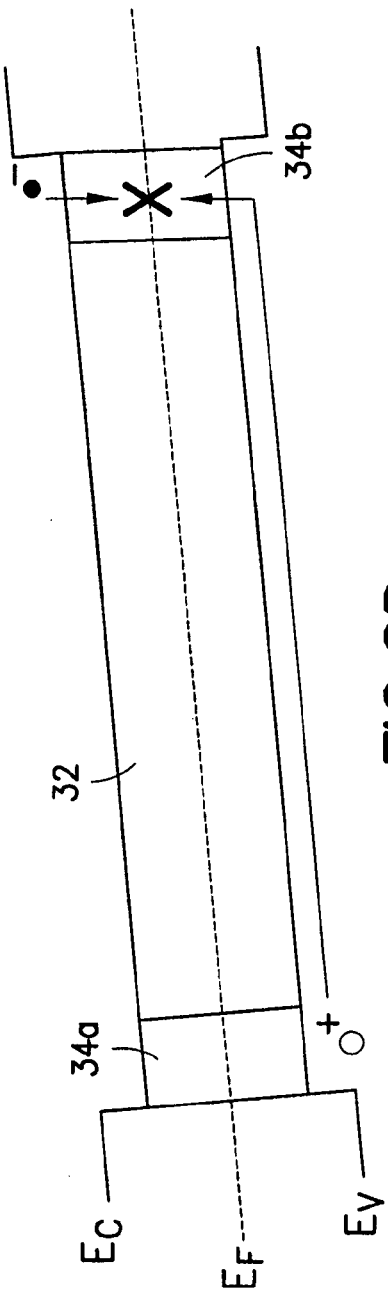

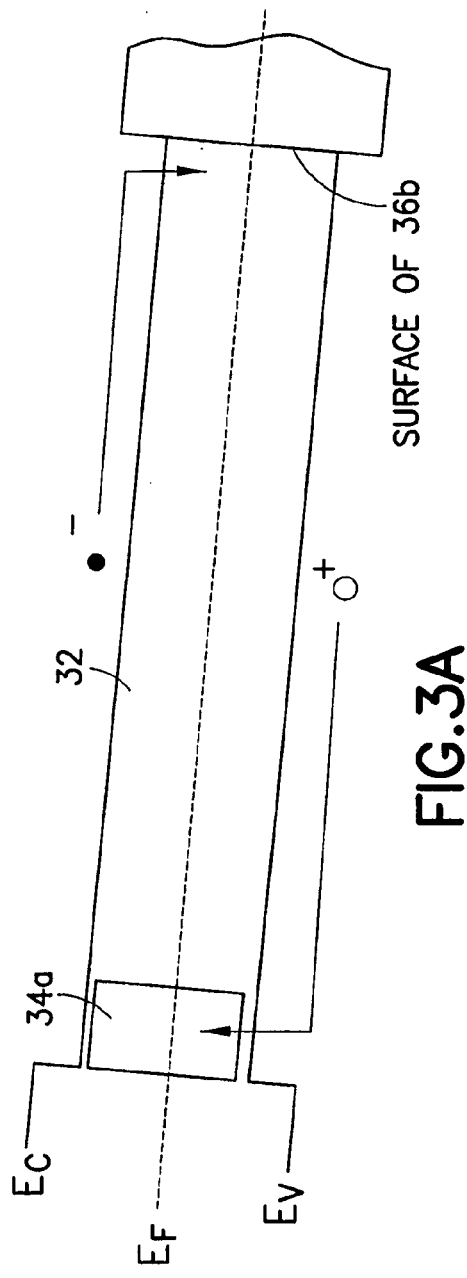
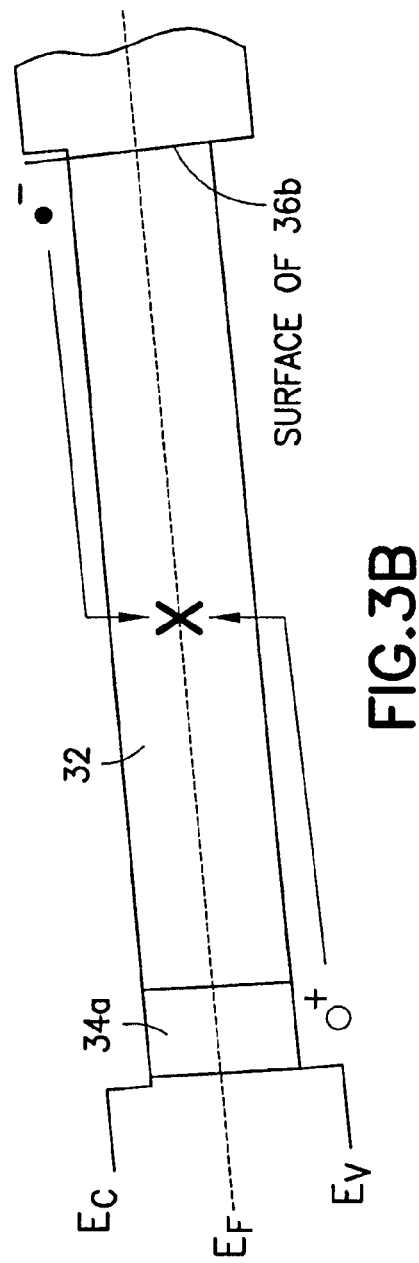
FIG.3A
FIG.3B

DICHROICS MANAGE
VISIBLE & IR SELECTIVITY
BROADBAND PBS
ALL IR IS
S-POLARIZED

OPTICALLY ADDRESSED SPATIAL LIGHT MODULATOR AND METHOD

CROSS-REFERENCE TO RELATED APPLICATION

This application claims priority to Provisional U.S. Patent Application No. 60/778,704, filed on Mar. 2, 2006, the contents of which is hereby incorporated by reference in its entirety.

TECHNICAL FIELD

This invention relates to optically addressed spatial light modulators (OASLMs), sometimes termed light valves.

BACKGROUND

There are several distinct technological approaches for generating a visible light display, particularly large size displays such as those characterized as large screen televisions. Liquid crystal displays generally exhibit high resolution and advantageous thinness (e.g., about 3 inches). These are typically limited to sizes of 42"(diagonal) or less due to cost constraints and the fact that a drive current cannot be easily maintained along a very long amorphous silicon row or column drive line, requiring significantly complex drive electronics. Liquid crystal displays suffer from the drawback that a single pixel can significantly deteriorate resolution over the entire display; large sheets of glass have fewer large panels, so the yield loss is highly non-linear and decreases with display size.

Another technology for large displays is plasma television, commonly commercially available in the range of 42 to 50 inches. While plasma offers good thinness (e.g., 4 inches) and a wide viewing angle, resolution is not as sharp as other technologies, the expensive addressing electronics balance bit depth against resolution rather than maximizing both, they are generally heavier and suffer from 'burn in' at the display screen over time, and they suffer from the same single-pixel shortfall as liquid crystal displays. While some research is ongoing into using organic LEDs (OLEDs) in large displays, these typically have a lifetime of about 8000 hours or less for such high-power applications and are seen as inherently limited.

Front and rear projection television is becoming more popular as they overcome some of the above problems with liquid crystal and plasma technologies. Projection systems enable screen sizes of 100 inches or greater, and typically suffer from resolution and/or brightness (e.g., contending with ambient light for a very large screen). Light valves are at the heart of projector systems, mixing shades of different colored light (e.g., red, green and blue) to produce a full spectrum of color in the displayed image. High temperature polysilicon (HTPS) implementations, such as those marketed by Seiko, Epson and Sony, generally use an arc lamp for illumination yet still exhibit low brightness at the display due to aperture constraints (ratio of light to area of reflection) and parasitic diffraction. Further, resolution in the more commercially popular models is no better than that of plasma.

Liquid crystal on silicon (LCoS) light valves are used by Sony, JVC, and a host of other manufacturers, in a relatively small segment of the large display market. While these improve brightness and even resolution over HTPS technology for little additional cost, they also use an arc lamp for illumination to overcome light losses between the arc lamp and the display. It is not unusual for light losses in LCoS to be 35% or more, due to aperture, parasitic diffraction, and aluminum reflectivity. The inventors see such losses as inherent in the LCoS technology, because much light is lost between 'tiles' (typically discrete aluminum reflectors) and an even greater amount is lost by diffraction from those tile boundaries.

Digital light processing (DLP), a technology for which Texas instruments is well known, also uses an arc lamp and generates mid-range brightness but lesser resolution than LCoS. DLP exhibits even higher light losses than LCoS, due to a spinning 'color wheel' in addition to micro-reflectors that impose loses similar to the LCoS tiles. The color wheel is seen as necessary for DLP in order to operate with a single light valve; multiple light valves for different colors are seen to drive costs high enough that DLP would not be commercially competitive with other technologies.

Each of HTPS, LCoS and DLP dispose the addressing electronics directly below the modulating surface. This leads to two competing concerns. First, large area CMOS dies for the drive electronics are highly expensive; increasing CMOS chip size is highly non-linear with cost. Second, optics require that the modulating surface be large enough to collect sufficient light to drive a large display with sufficient resolution and brightness. The confluence of drive electronics and the modulating plane as above result in low yield and high cost for manufacturing HTPS, LCoS and DLP projectors. What is needed in the art is a technology that enables large screen displays (e.g., greater than about 42 inches) with good resolution and brightness, without the tradeoffs above between the size of the CMOS chip and the optical modulating surface that drive up costs in the current technology.

SUMMARY

In accordance with one embodiment of the invention is an optical device that includes the following layers in the described order. An electrically insulating first barrier layer is disposed over a first electrode layer, and a photoconductive layer is disposed over the first barrier layer. A carrier confining layer is disposed over the photoconducting layer. The carrier confining layer defines a volume throughout which a plurality of carrier traps are dispersed. An electrically insulating second barrier layer is disposed over the carrier confining layer, and a light blocking layer is disposed over the second barrier layer for blocking light of a selected wavelength band. A reflective layer is disposed over the light blocking layer for reflecting light within the selected wavelength band, a birefringent or dispersive layer is disposed over the reflective layer, and an optically transmissive second electrode layer is disposed over the birefringent or dispersive layer. The term 'disposed over' does not imply that the layers must be bonded to one another directly; intervening layers may be interposed between the above described layers as detailed further below.

In accordance with another embodiment of the invention is a method for making a multi-layered optical device. In this method, a first conductive layer is provided and over that first conductive layer is grown a gallium arsenide GaAs layer at a temperature less than about 425 degrees C. An electrically insulating layer is disposed over the GaAs layer, a photoconducting layer is disposed over the electrically insulating layer, and a light blocking layer is disposed over the photoconducting layer. The light blocking layer blocks light of a selected wavelength band. A reflective layer is disposed over the light blocking layer, and the reflective layer reflects light of the selected wavelength band. A birefringent layer or a dispersive layer is disposed over the reflective layer, and an optically transmissive second conductive layer is disposed over the birefringent or dispersive layer. As with the optical device above, the terminology that a layer is disposed over another layer is not to imply that the disposed layer necessarily must be in contact with the layer over which it is disposed; intervening layers are possible without departing from these teachings, and several such intervening layers in addition to those detailed above are particularly described below.

BRIEF DESCRIPTION OF THE DRAWINGS

The foregoing and other aspects of these teachings are made more evident in the following Detailed Description, when read in conjunction with the attached drawing figures.

FIG. 1A is a schematic cutaway view showing some of the distinct layers of an Optically Addressed Spatial Light Modulator (OASLM) according to an embodiment of the invention.

FIG. 1B is a schematic diagram similar to FIG. 1A, but showing a different embodiment.

FIGS. 2A-C are schematic diagrams illustrating movement and trapping of electrons and holes within the layered light valve of FIG. 1A.

FIGS. 2D-2E are schematic diagrams similar to FIG. 2C but showing electrons and holes pairing in the respective second and first carrier confining layer.

FIGS. 3A-3C are similar to FIGS. 2B-2C and 2E respectively, but for the embodiment of FIG. 1B.

DETAILED DESCRIPTION

Optically addressed light valves offer several advantages over other large-screen commercial imaging technologies such as MEMS, liquid crystal on silicon, or High Temperature Polysilicon. For example, certain embodiments of this invention offer significant cost advantages over these technologies. Light valve embodiments described herein are able to preserve étendue to a much more significant level than projection technologies using color sequential modulation or multiple light valve systems with limited surface area such as is the case with liquid crystal on silicon displays. Étendue may be conceptualized as optical throughput efficiency through disparate optical devices. When a light source is coupled to an optical engine, étendue is a measure of the optical efficiency of that coupling. If the source is a laser, étendue may generally be readily preserved. Where the source is non-point as are commonly used in large-screen imaging arts, étendue becomes a significant factor because optical coupling from a non-point light source to a modulator is typically very poor largely because the modulator is generally small (e.g., a chip measuring less than 0.9 inches in diagonal), so light not directly impinging upon the modulator is lost if not effectively managed for étendue. Merely enlarging the silicon-based chip size is not cost effective because to do so would reduce the number of chips made from a single wafer, effectively reversing some of the efficiencies that drive Moore's law of continually decreasing cost per chip. The relation between chip size and cost is not a linear one; doubling chip size more than doubles the cost of that larger chip, typically much more than double. Generally, the prior art uses a high power white light source such as an arc lamp, whose light is then modulated and pixilated, to overcome poor étendue by its sheer optical output power. But an arc lamp runs very hot and requires routine bulb replacement. Embodiments of this invention provide a more elegant solution than merely increasing wattage at the light source. Further, optically addressed light valves avoid the constraint of other technologies that the addressing electronics lie directly below the modulating optical plane. This is detailed in the Background section, and leads to higher cost and lesser performance due to the tradeoff between sizes of the CMOS electronics chip and the optical modulating plane.

Figure 1C:
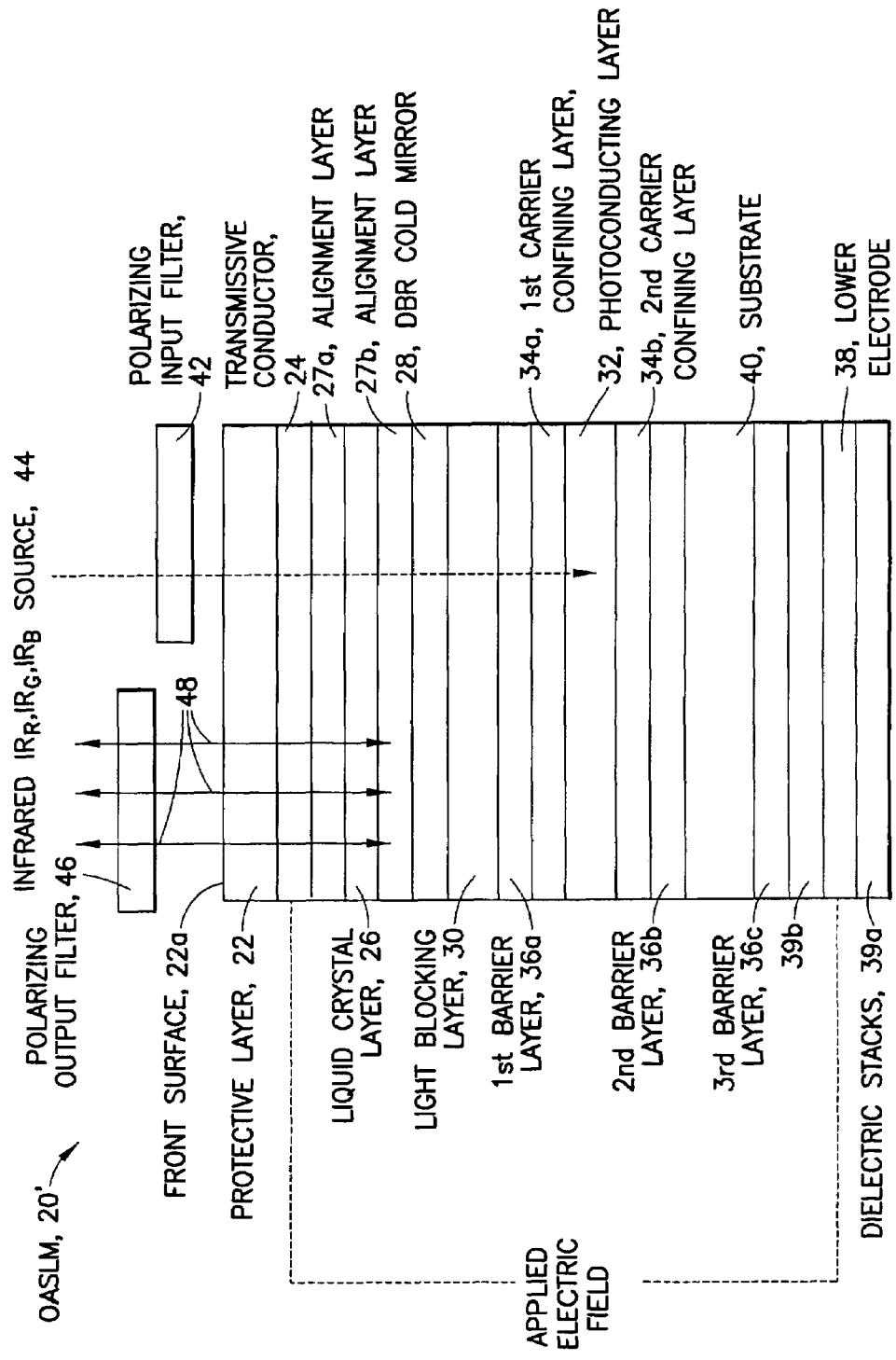
FIG. 1C is a schematic diagram similar to FIG. 1A, but showing yet another embodiment.

FIG. 1A illustrates in sectional view an OASLM 20 optical device according to an embodiment of the invention. Relative layer thicknesses of FIG. 1A or 1B are not to scale nor are they proportional relative to one another; FIGS. 1A-1C are for illustration of the various layers as distinct entities. As the embodiments of FIGS. 1A-1C are forward addressed (from the top), the various layers are detailed below in the order of top to bottom. FIG. 1A is described with specificity, FIG. 1B is described with respect to its differences over FIG. 1A, and FIG. 1C is described with respect to its differences over FIG. 1B.

In FIG. 1A, a protective overlayer 22 forms a front surface 22a of the OASLM 20 to protect the underlying layers, and is substantially transmissive to light in both the visible and infrared (IR) bands. Glass, sapphire, quartz, SiC, ZnO, and GaP are exemplary but not exclusive materials from which the protective overlayer 22 may be formed. Beneath the protective layer 22 is a transmissive conductor 24 that is electrically conductive and transmissive to light in the visible and IR bands. Transmissive conductive layers are known in the art (See for example, U.S. Pat. No. 5,084,777; "PROGRESS IN LIQUID CRYSTAL LIGHT VALVES" by W. P. Bleha in *Laser Focus/Electro-Optics*, Oct. 1983; and "DEVELOPMENT OF GALLIUM ARSENIDE-BASED SPATIAL LIGHT MODULATORS" by Michael C. Hebbron and Surinder S. Makh in *PSIE* vol. 825 *Spatial Light Modulators and Applications* II, 1987). An exemplary material for the conductive layer is indium tin oxide (commonly ITO), which is essentially transparent to visible light and attenuates IR light only slightly. The conductive layer 24 substantially spans a cross section of the OASLM 20 in order to provide a relatively uniform charge across the entire cross section.

Below the transparent conductive layer 24 is a birefringent or dispersive layer 26, such as liquid crystals, bismuth oxide, or other materials whether crystalline in structure or not that can modulate light. The distance between layers 24 and 26 is called the cell gap wherein layer 26 is substantially uniform and important as this layer defines the modulation of the light when the OASLM 20 is in operation. Flanking each major surface of the birefringent/dispersive layer 26 (i.e., both above and below the birefringent/dispersive layer 26 as illustrated in FIG. 1A) is an alignment layer (not shown), for anchoring layer 26. An exemplary material for the alignment layers is silicon oxide $SiO_x$. As will be shown, since the light to be modulated passes twice through the birefringent/dispersive layer 26, this layer need only modulate the read light half as much as for a single pass device and as such can be thinner increasing switching speed and resolution.

Below the birefringent/dispersive layer 26 is a distributed Bragg reflector DBR 28 or cold mirror layer, more generally a reflective layer comprised of dielectric materials that is reflective within a selected wavelength band. In one embodiment, addressing light is infrared and the modulated read light is visible, so the DBR layer 28 reflects or block light in the visible band yet allows selected spectral wavelengths of IR light to pass relatively unobstructed. The DBR layer 28 may be readily tuned to pass only a particular JR band of interest, so that of all light entering the OASLM 20 from the front surface 22a (e.g., the modulated read light and addressing light), only the IR light within the bands of interest is allowed to transmit through the DBR layer 28. The DBR layer 28 can be adjusted by design of the DBR layer 28 itself to form a notch or band pass filter for specific IR wavelengths or in combination with the light blocking layer (LBL). As an alternative, the embodiment of FIG. 1B shows a first DBR layer 28a similar to the DBR layer 28 described above with reference to FIG. 1A, deposited over an LBL 30 of potentially lesser thickness than would typically be used with the embodiment of FIG. 1A, which in turn is deposited over a second DBR layer 28b. as compared to FIG. 1A, this embodiment adds a second DBR layer 28b between the LBL 30 and the first barrier layer 36a.

As will be detailed below, each IR band of interest for addressing light can be considered to address a specific spectral width of light in the output image, called the read light, for which that particular IR band addresses. In an exemplary embodiment, the DBR 28 (or DBRs 28a, 28b) is (are) made from alternating layers of materials having a different refractive index for given wavelengths of interest, such as titanium dioxide $TiO_2$ and silicon dioxide $SiO_2$, or aluminum arsenide AlAs and gallium arsenide GaAs. In either implementation the DBR can be made of a variety of materials including but not limited to $NbO_5$, $SiO_2$, $TiO_2$, $Ta_2O_5$, ZnSe, AlAs, GaAs, etc. While these descriptions are in the context of IR addressing light and visible read light, these wavelength bands are exemplary; read light may be for example UV or IR, leading to different materials used to form various layers in the light valve in order to block/reflect the wavelength bands for the non-visible read light.

Returning to FIG. 1A, a light blocking layer 30, separate and distinct from the DBR layer 28, lies below the DBR layer 28 to further block any visible light, that may pass, since the DBR layer 28 may be less than 100% efficient in reflecting visible light (or other light outside the intended pass band). The light blocking layer 30 also may be tuned to transmit or partially absorb selected IR bands of interest by selecting a material with an appropriate indirect or direct bandgap. The light blocking layer 30 is generally about 1 micron thick and acts as an optically invariant electrical component. That is, depending on the kind of electric field applied across the device the capacitance, resistance and or impedance of the light blocking layer 30 does not vary with the intensity of light incident upon it. Were it to be otherwise, the light blocking layer 30 would have varying electrical properties that would induce unintended light modulation at layer 26 in the embodiments of FIGS. 1A-1B, making the overall performance of the device ineffectual. A favorable characteristic of the light blocking layer 30 is that any charge carriers generated therein are short lived. The material of the light blocking layer 30 is selected to be highly absorbing for spectra with an energy greater than the bandgap of that material (if the material has a bandgap). The light blocking layer 30 may be made from a low temperature material (see the description below for the carrier confining layers 34a, 34b) or even low quality AlGaAs, InGaAs, GaAs, a-SiGe:H, CdTe, or for example fine grained polycrystalline or deposited GaAs, such that any charge carriers (e.g., holes or electrons) generated by the absorption of spectra within the energy range above the bandgap are short lived (e.g., they do not separate under the applied electric field across the electrodes 24, 38), and therefore do not significantly modulate the capacitance, resistance or impedance of the light blocking layer 30.

A photoconducting layer 32, shown in FIG. 1A as having a first carrier confining layer 34a and an optional second carrier confining layer 34b adjacent to its respective opposed major surfaces, is located below the light blocking layer 30 and is where the addressing IR light is converted to electrical charge carriers (holes and electrons). Due to the reflection of visible light at the DBR layer 28, and absorption or reflection at the light blocking layer 30 of light outside the pass band that passes the DBR layer 28, IR light within the selected band of interest passes to excite the photoconductor portion 34 of the photoconductor layer. Any read light that does reach photoconducting layer 32 will likely generate carriers and as such the change in capacitance, resistance and or impedance of this layer as affected by the residual read light reaching it must generate a voltage across the birefringent layer 26 below its threshold voltage so as to not cause modulation of the read light at that layer.

An exemplary material for the photoconducting layer 32 is high quality gallium arsenide GaAs, possibly ranging in In and Al mole fractions from InGaAs to AlGaAs. This layer 32 can range in thickness up to tens of microns, and some exemplary embodiments define a much lesser thickness on the order of hundreds of nanometers to microns (e.g., 100 or 200 nms to 2 or 5 microns) which increases resolution as compared to thicker hydrogenated amorphous silicon photoconductive layers. These lesser thicknesses are thinner than prior art photoconductor layers that use a rear-addressing regimen. Note however that it is possible to address the devices of the type described herein from the rear as well by using appropriately selected addressing spectral wavelengths and or by removing the bottom wafer and bonding the remainder of the structure to a material that is essentially transparent to the selected addressing spectra. Most of the photoexcitation occurs in the first two microns of the In/GaAs/GaAs/AlGaAs photoconductor material with its high absorption properties upon which the incident light impinges. AlGaAs and GaAs are preferred for the photoconducting layer 32 for manufacturing efficiency, as will be detailed below in conjunction with the first carrier confinement layer 34a (and second carrier confinement layer 34b) and the substrate 40.

The first carrier confining layer 34a lies nearer the visible light blocking layer 30 (as compared to the second carrier confining layer 34b), and is impregnated with arsenic precipitates (or a distribution of some other energy barrier nodes) that substantially impede movement of the charge carriers near the junction between the carrier confining layer and the insulating layer 36a. The second carrier confining layer 34b lies nearer the substrate 40, and is also impregnated with arsenic precipitates or a plurality of some other energy barrier nodes that substantially impede movement of the charge carriers near the junction between the carrier confining layer and the insulating layer 36b. The total thickness of each carrier confining layer 34a, 34b is preferably between about five and twenty nanometers in one embodiment. High thickness for the carrier confining layers 34a, 34b would render the confining layers to absorb significant energy destined for the photoconductor which is undesirable. Thinner dimensions for the carrier confining layers 34a, 34b ensure that it is not optically active and that the charge carriers are well trapped by the As precipitates.

An exemplary material for the carrier confining layers is commonly termed low temperature grown gallium arsenide denoted as LTG-GaAs, low temperature grown indium gallium arsenide denoted as LTG-InGaAs and/or low temperature grown aluminum gallium arsenide denoted as LTG-AlGaAs. LTG-GaAs, as well as the other LTG materials, is grown at a lower temperature than 'normal' GaAs (or other materials), typically within the range of about 200-300 degrees C., whereas 'normal' GaAs is typically grown at a temperature in the range of about 500-600 degrees C. In some contexts, intermediate grown temperature GaAs, referred to as ITG-GaAs, is grown in the temperature range of about 375-425 degrees C. Note that the above are inexact ranges; the terms LTG-GaAs and ITG-GaAs are known in the art but not precisely defined by temperature. The second carrier confining layer 34b is optional, and either or both carrier confining layers 34a, 34b may range in thickness from about five to twenty nanometers in exemplary embodiments to assure that the carrier confining layer is not optically active. FIG. 1B illustrates an embodiment absent the lower or second carrier confining layer 34b, and its operation is further detailed with respect to FIGS. 3A-3B below.

A separate interface between the carrier confining layers 34a, 34b and the photoconductive layer 32 may grade the transition. For example, layers of indium gallium arsenide InGaAs and/or AlGaAs may be disposed between the GaAs photoconductive layer 32 and either or both of the carrier confining layers 34a, 34b, compositionally graded from pure GaAs at the photoconductive layer 32 to a mole fraction of AlGaAs or InGaAs along the transition (distinct transition layers not shown) and turning into LTG-GaAs, LTG-InGaAs and/or LTG-AlGaAs at the carrier confining layers 34a, 34b. In one embodiment it may be preferable to have the carrier confining layer made of LTG-AlGaAs with compositional grading to a tuned photoconductive layer 32 which may be made of AlGaAs, GaAs or InGaAs, as the As precipitates in LTG-AlGaAs are deeper level and as such form even greater traps of carriers. Another embodiment may have compositionally graded series of layers of AlGaAs, GaAs and/or InGaAs and their LTG counterparts to tune the resistance and/or capacitance of the photoconductive layer.

An optional first barrier layer 36a lies between the first carrier confining layer 34a and the light blocking layer 30. This prevents charge carriers, trapped within the first carrier confining layer 34a from migrating toward the light blocking layer 30 and the birefringent layer 26. A second optional barrier layer 36b lies between the second carrier confining layer 34b and a lower electrode layer 38. The second barrier layer 36b prevents charge carriers from migrating between the lower electrode 28 and the photoconducting layer 32 or second carrier confining layer 34b depending on whether the optional carrier confining layer 34b is present. The barrier layers 36a, 36b may or may not be made from the same material as one another. An exemplary material for the barrier layers 36a, 36b is any insulating material compatible with adjacent layers, such as aluminum gallium arsenide AlGaAs, aluminum arsenide AlAs, or any dielectric material.

The lower electrode layer 38 may be any conductor, and for a forward addressed embodiment as shown in FIG. 1A the lower conductor 38 need not be optically transmissive. Exemplary materials for the lower conductor layer 38 include doped GaAs, doped AlGaAs (of any of various mole fractions of Al), doped InGaAs (of any of various mole fractions of In), doped GaInP lattice matched to GaAs, or a conductive oxide such as indium tin oxide (commonly ITO) deposited after removal of the GaAs substrate used for the epitaxy of the device, or in fact it may be the substrate itself which can be conductive in which case 38 and 40 are one and the same.

The substrate layer 40 is preferably a wafer made of GaAs, and may serve three functions. First, it is a mechanical substrate to support the overall OASLM 20. Second, it may act as the lower electrode 38 in opposition to the transmissive conductor 24. As illustrated in FIG. 1A, an electric field (preferably AC) is applied across the lower electrode 38 and the transmissive layer 24, as will be detailed below. If a separate lower electrode layer 38 is disposed as shown in FIG. 1A, then any electrically conductive properties of the substrate 40 further distribute charge across the entire cross section of the OASLM 20. Alternatively, the substrate 40 may act as the sole lower conductor and the separate lower conductor and layer 38 is not necessary. Alternatively the substrate 40 may be semi-insulating with an electrode comprised of doped InGaAs, GaAs, AlGaAs, InAs, ITO, Au/Ti or other common electrode material deposited beneath the substrate with or without an optional insulating layer separating these comprised of AlAs, AlGaAs, SiO$_2$ or other suitable material. Third, the substrate 40 acts as a seed layer from which the GaAs epitaxy is grown (in certain embodiments). In some embodiments the GaAs wafer may be removed and the layers grown by epitaxy bonded to a different substrate or not. There are several techniques to accomplish this including but not limited to polishing, lift off, and chemical separation using a sacrificial layer to allow for this, to name a few. The GaAs epitaxy may be used in some embodiments to form the second barrier layer 34b (e.g., AlGaAs), the second carrier confining layer 34b (e.g., LT-GaAs), the photoconducting layer 32 (e.g., GaAs), the first carrier confining layer 34a and the first barrier layer 36a, and even the light blocking layer 30. Of course, other embodiments may divide at least the mechanical substrate and lower electrode functions into distinct layers and/or use different materials for some layers noted immediately above, perhaps losing some efficiencies in manufacturing that arise from growing these various layers in a single varying process from the GaAs wafer 40. Other exemplary materials for the substrate 40 include germanium wafers, silicon germanium on silicon wafers, ZnSe wafers and InGaP to name but a few.

A GaAs wafer is preferred as the substrate 40 for several reasons. While silicon is vastly more common, GaAs wafers rank second in commercial wafer production volume, so they are readily available. For example, GaAs chips are currently used in cell phones (HBTs and pHEMTs) DVD and CD players, and for red LEDs. From a commercial perspective, the finished cost per size for GaAs used in an OASLM is not nearly as non-linear as cost per size for silicon chips that incorporate transistors (such as for LCoS or DLP technologies). While cost scaling is not quite linear with surface area, the cost per chip size relation for an OASLM made of GaAs is quite inexpensive relative to similarly sized devices using CMOS such as LCoS and MEMS devices where the relation is highly non-linear. Increasing chip size is a simple way to increase étendue in an overall optical system, and the above cost considerations make a larger GaAs chip much more commercially viable than a Si chip (with CMOS electronics) of the comparably increased size. From a technical perspective, a molecular beam epitaxy MBE or metal-organic chemical vapor deposition MOCVD layer can be readily grown on a monolithic GaAs wafer. Current technology does not enable the LTG-GaAs or other LTG-type layers with precipitates, as noted herein, to be grown using a MOCVD process, but rather is grown by MBE though there have been reports that this is possible. All the other epitaxial layers can be grown by MBE or MOCVD processes. Prior commercialization of GaAs epitaxy has advanced the art to the point where lattice-matched GaAs epitaxy can be grown with good yield, reasonable cost, and high uniformity. Prior art optically addressed digital light valves, such as those originally pioneered many years ago by Hughes Electronics® and Greyhawk Systems®, were generally based on amorphous silicon, using a sputtering process to deposit hydrogenated amorphous silicon a-Si:H on Indium Tin Oxide on glass. Because the layers were thick, and the coefficients of thermal expansion of the substrates and electrodes that they were deposited on were different, cracks often developed after deposition during cooling.

FIG. 1C illustrates in schematic form yet another embodiment of the OASLM 20, with only differences as compared to FIG. 1B described in detail here. Note that in FIG. 1C, the lower electrode 38 is disposed below the substrate 40, on the opposite side as compared to the upper electrode/transmissive conductive layer 24. Dielectric stack layers 39a, 39b lie on either side of the lower electrode 38, and a third barrier/insulating layer 36c is disposed between the lower electrode 38 and the substrate 40. Like FIG. 1A, FIG. 1C includes only a single DBR layer 28, directly above the light blocking layer 30. Also like FIG. 1A, FIG. 1C includes a second carrier confining layer 34b disposed on the opposite side of the photoconducting layer 32 as compared to the first carrier confining layer 34a, whereas FIG. 1B includes only a single carrier confining layer. In FIG. 1C, the dielectric stack layers 39a, 39b are optional, as are any or even all of the three barrier/insulating layers 36a, 36b, 36c. Both the second and third barrier layers 36b, 36c are optional because in some embodiments the substrate 40 itself may electrically isolate the lower conductor 38 from the second carrier confining layer 34b and photoconducting layer 32. As is evident from FIGS. 1A-1C, these different embodiments may be combined to yield different specific layer structures according to these teachings without departing from the scope of this invention; the various functions and interrelationships of layers are detailed herein to enable such other combinations.

Characteristics of the carrier confining layers 34a, 34b are now described in detail. After being grown, the carrier confining layers 34a, 34b are annealed at a temperature elevated over the temperature at which those layers were grown. For example, for LTG-GaAs grown at about 200-300 degrees C., anneal temperature might be within the range of about 500-600 degrees C. For LTG-AlGaAs also grown at 200-300 degrees C. the anneal temperature might be within the range of about 600-700 degrees C., and the anneal may continue for at least about twenty minutes or more. Longer anneal periods typically do not adversely affect the desired properties of the carrier confining layers 34a, 34b. During the anneal, the arsenic that precipitated out of the stressed GaAs lattice during the low-temperature growth phase becomes nearly uniformly distributed throughout the volume of the carrier confining layers 34a, 34b, and forms distinct, nearly sphere-like nodes. These arsenic precipitates or carrier trapping nodes act as the metal component of Schottky barriers in those layers 34a, 34b of the completed OASLM 20, exhibiting an energy level below that of the electrons and holes in layer 32 preventing them from migrating, at least for some non-negligible period of time, laterally or in the direction of the front surface 22a or substrate 40. A non-negligible period of time is considered in the context of the overall OASLM 20. In accordance with standards currently controlling in the U.K. and U.S., a video frame must be refreshed about every $1/24^{th}$, $1/50^{th}$ or $1/60^{th}$ a second respectively. Embodiments of the invention refresh the video frame at double that rate, so a non-negligible constraint on charge carrier movement for those 120 Hz embodiments holds the charge carriers in place for at least $1/48^{th}$ to $1/120^{th}$ of a second. Other embodiments with different refresh rates may operate with a different cycle rate and therefore define a non-negligible period of time differently. In general, the carrier confining layers 34a, 34b, are designed to retain or trap charge carriers of one type (holes or electrons depending on the direction of the applied electric field) for at least the period of time defined by the cycling frequency of the applied electric field across the electrodes 24, 38. Because charge carrier migration is properly modeled as a distribution, the carrier confining layers may be considered to trap a substantial majority (e.g., greater than about 85%, preferably greater than about 95%) of charge carriers of one type (holes or electrons depending on the direction of the applied electric field) for that time period.

Operation of the OASLM 20 is now described. Preferably, a polarizing input filter 42 is imposed between the OASLM 20 and an IR addressing source 44 (addressing light) if using a birefringent modulating layer 26, of which FIG. 1A shows the source 44 as three distinct IR sources one each destined to address an OASLM tuned to modulate either red, green or blue visible light ($IR_R$, $IR_G$, and $IR_B$ respectively). One addressing source 44 may be used as will be described below with reference to FIG. 5, though any number of addressing sources and/or light valves may be used in various embodiments, not necessarily limited to the one or three addressing sources detailed herein. For example, more than three color sources and light valves may be used for greater precision and efficiency over color control in the projected image. Such variations follow readily from the examples shown herein. The input polarizing filter 42 is preferably reflective and not made in one piece with the OASLM 20.

The addressing IR light from the source 44 (which may or may not be polarized) passes through the glass overlayer 22 and the transmissive conductor 24 substantially unattenuated. Light outside the selected IR band(s) may be present, due to reflection of the visible light that is output from the OASLM 20, from the source 44 itself, or from any other source emitter, so design of the OASLM 20 does not presume only IR light in the selected bands enters the front surface 22a. The addressing IR light is passed through the liquid crystal layer 26. Since the visible light to be modulated passes through layer 26 twice, once along the input pathway and once along the output pathway as will be described, the thickness of layer 26 may be less than for transmissive light valves, preferably by half. The applied electric field across the transmissive conductor 24 and the lower electrode 38 (or substrate/wafer 40 as lower electrode or electrode beneath substrate/wafer 40) in conjunction with the imposition of the input IR addressing light that strikes the photoconducting layer 32 modulates on layer 26. The IR addressing light can impose, for example, a pulse width modulation by providing a constant-amplitude, time-modulated burst of energy (induced by photons in this instance), determined by the interaction or the various layers in the OASLM and the applied electric field. As tested, the inventors were able to achieve 2.1 million squares in the birefringent layer 26, yielding 2.1 million pixels in the output image. The resolution can be lower by definition and in fact substantially higher. The IR addressing light can also be comprised of a sequence of light pulses and/or an amplitude and/or time modulated sequence or single pulse of energy.

The IR addressing light passes from layer 26 through the DBR layer 28 and the light blocking layer 30, which strip nearly all visible light and in fact most light from outside the band(s) of interest to which those layers 28, 30 are tuned from passing below the light blocking layer 30. The IR addressing light then passes through the first barrier layer 36a, the first carrier confining layer 34a and then the photoconducting layer 32. Because of the thickness of the carrier confining layers 34a, 34b, (e.g., preferably about 5 to 20 mm), they are not optically active or optically responsive. While optical responsivity is generally a function of wavelength, for all practical purposes it is understood that LTG-GaAs is not optically responsive until its layer thickness is above about 100 nm for wavelengths in the visible or IR regions which are above the bandgap energy. LTG-GaAs in layer thicknesses less than about 100 nm cause that layer to be optically non-responsive, and no charge carriers are generated from the addressing light within that thin layer of LTG-GaAs. In short, the carrier confining layers 34a, 34b on the thickness orders described herein are not photoconductive. It is noted that the photoconducting layer 32 is not considered to be carrier-trapping; electrons and holes migrate freely within that photoconducting layer 32. In terms of the charge carriers for certain embodiments then, they are generated only within the photoconducting layer 32; they are trapped only in the carrier confining layers 34a, 34b; and upon reversal of the applied electric field, the holes drift one direction and the electrons drift the other direction and so only one type of carrier ends up in each carrier confining layer. Upon reversal of the applied electric field one or both types of carriers are freed to then recombine with the opposite carrier that was trapped.

Spatially localized electrons and holes within the photoconducting layer 32, excited by the addressing IR light, are then drifted in opposite directions of the photoconducting layer 32 by an applied electric field; electrons toward the second carrier confining layer 34b whose flow is opposite to the direction of the applied electric field and holes toward the first carrier confining layer 34a in the direction of the electric field, or vice versa depending on the applied electric field direction. This is shown schematically for one electrical model interpretation in FIGS. 2A-2C as a hybrid schematic/electrical diagram.

Figure 2E:
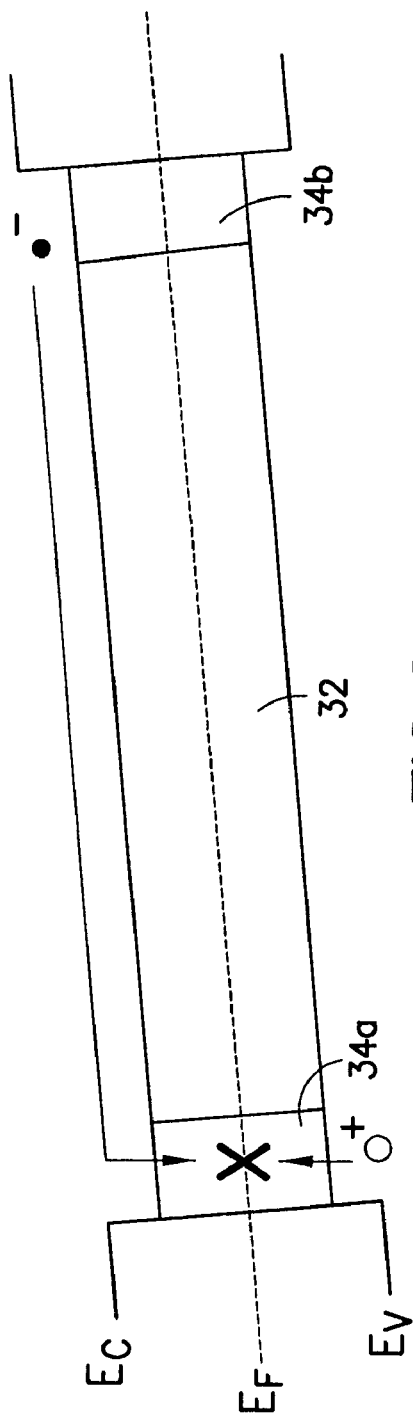

FIG. 2A shows the relevant layers as being static, with no free charge carriers. The photoconducting layer 32 is made of a high quality undoped GaAs, InGaAs and/or AlGaAs materials, which is flanked by the first 34a and second 34b carrier confining layers. Addressing light, shown in FIG. 2A as IR photons hv, enter the illustrated layers from the left so as to strike the first carrier confining layer 34a prior to the others illustrated in FIG. 2A. In FIG. 2B, the addressing IR photons hv impinge the photoconducting layer 32, freeing charge carriers electrons $e^-$ and holes $o^+$ within that layer 32. As shown in FIG. 2B, the applied electric field causes the holes $o^+$ to move toward the first carrier confining layer 34a, and the arsenic precipitates within that layer 34a impede movement of the holes $o^+$ from passing through that layer 34a or from migrating laterally within it by trapping them in the carrier confining layer. Similarly and simultaneously, the same applied electric field causes the electrons $e^-$ to move toward the second carrier confining layer 34b, and the arsenic precipitates within that layer 34b trap those electrons, impeding movement of the electrons $e^-$ beyond that layer 34b or laterally across it, so that the opposed electrons $e^-$ and holes $o^+$ are trapped at opposite ends of the photoconducting layer 32. At FIG. 2C, the applied electric field is reversed (or otherwise relaxed or modulated), causing the electrons $e^-$ and holes $o^+$ from the opposed carrier confining layers 34a, 34b to recombine within the photoconducting layer 32, clearing the OASLM 20 for the next image frame. FIG. 2D shows the electrons and holes pairing in the second carrier confining layer 34b, and FIG. 2E shows the electrons and holes paired in the first carrier confining layer 34a, such as where the applied electric field is relaxed rather than reversed. As above, in one embodiment the applied electric field is reversed at least as often as a frame refresh rate stipulated in a video transmission standard, which in the U.S. is 60 Hz (although other applications may require faster or slower frame rates), and the carrier confining layers 34a, 34b are designed to trap a substantial distribution of electrons or holes for at least the time period defined by the refresh rate (the rate at which the applied electric field is reversed and the frame image is refreshed). In an exemplary embodiment, the OASLM 20 reverses applied electric field at 120 Hz. Other exemplary frequencies include 24 Hz, 50 Hz, 60 Hz, 72 Hz, 120 Hz, and greater.

The carrier confining layers 34a, 34b having arsenic precipitates acting as Schottky barriers are capable of retaining the electrons $e^-$ and holes $o^+$ in place for about 50 milliseconds at room temperature, whereas a refresh rate of 60 Hz requires only about 16.67 milliseconds. Doubling the refresh rate clearly does not exceed the electrical capabilities of the carrier confining layers 34a, 34b. These times are different depending on the LTG material selected such as AlGaAs, GaAs and InGaAs.

These localized charges from the electrons $e^-$ and holes $o^+$ produce a localized electric field within certain layers of the OASLM 20. These fields interact with the externally applied electric field and modulate the localized electric field nearest layer 26 which is terminated by the transmissive conductor 24 above layer 26 which in turn translates an image of the charge packets in the first carrier confining layer 34a to the light to be modulated.

Figure 2F:
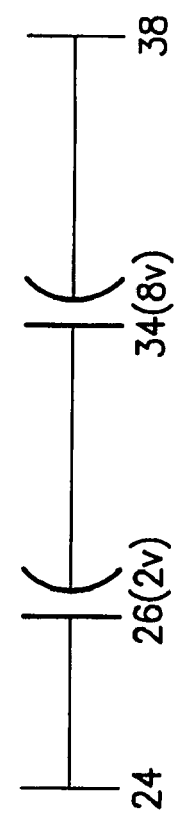
FIG. 2F is an equivalent circuit representing certain layers in the light valve of FIG. 1A.

One simplified electrical circuit is shown in FIG. 2F (others exist partially depending on the frequency of the externally applied electric field), wherein the photoconducting layer 32 and the birefringent layer 26 are shown as capacitors in series between the lower electrode 38 (or substrate 40 as lower electrode) and the transmissive conductor 24 as top electrode. Note that each layer of the light valve illustrated in FIG. 1A contributes some capacitance; only those layers relevant to the below explanation are represented in FIG. 2F. The thickness of the various layers, and their dielectric constants, determine that layer's capacitance. As shown in FIG. 2F, in this example where we assume a 10 V applied electric field, the birefringent layer 26 (nearer the top electrode 24 of FIGS. 1A-1B) exhibits a potential drop of about 2 volts (although this can be different), whereas the photoconducting layer 32 (nearer the bottom electrode 38 of FIGS. 1A-1B) exhibits a potential drop of about 8 volts (although this can be different). As the local impedance, capacitance or localized electrical fields within the photoconducting layer 32 change the voltage drops from 8 volts to 6 volts, the excess voltage goes to layer 26, raising its potential from 2 volts to 4 volts. This stimulates layer 26 to modulate (assuming the threshold voltage for this layer is between 2 and 4 volts) the read light that passed/reflects through it. The above voltage figures are for illustration; the light valve may operate in voltage ranges far removed from those noted above.

Returning to FIG. 1A, read light 48 (which may or may not originate from the same source 44 as the IR addressing light) in the visible range is directed toward the front surface 22a, and passes into the OASLM 20 into layer 26, which by FIG. 2E now carries the image from the addressing light and photoconducting layer 32. The read light 48 is prevented from reaching lower layers by the DBR layer 28 and the light blocking layer 30. The read light 48 may pass through a polarizing output filter 46 prior to striking the front surface 22a. The read light 48 is modulated at layer 28, reflects from the DBR layer 30, is modulated again at the birefringent layer 28 and passes out again through the front surface 22a (and possibly the polarizing output filter 46) for projection as visible (or other wavelength band) light. Transmissive versions of this structure are also possible.

Figure 3C:
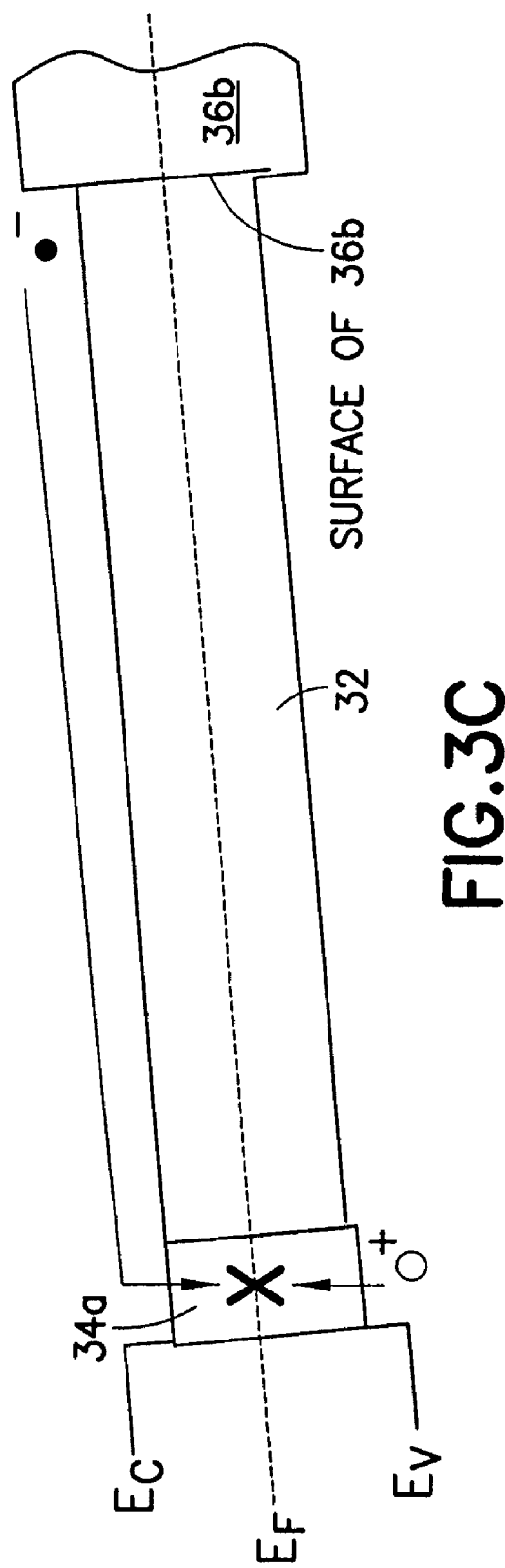

FIGS. 3A-3C mirror FIGS. 2B-2C and 2E respectively, but for the embodiment of FIG. 1B that lacks the second carrier confining layer 34b of FIG. 1A. With an applied electric field, FIG. 3A shows holes drifted toward the first carrier confining layer 34a (that nearest the first barrier layer 36a and the light blocking layer 30) as with FIG. 2B, but the electrons are drifted toward the second barrier layer 36b. These electrons generally remain in the photoconductive layer 32 but accumulate nearer the major surface of that layer 32 furthest from the first carrier confining layer 34a, and nearest to the second barrier layer 36b, due to the applied electric field. Upon reversal, relaxation, or other modulation of the applied electric field, FIG. 3B illustrates the holes drifted back into the photoconductive layer 32, and the electrons drifted either strongly toward the first carrier confining layer 34a (in the case of reversal of the applied electric field) or merely drifted to a more equal distribution throughout the photoconductive layer 32 (in the case of relaxing the applied electric field). FIG. 3C illustrates that the electrons that accumulated near the second barrier layer 36b combine within the first carrier confining layer 34a with holes that were previously trapped in that first carrier confining layer 34a. In either instance, holes and electrons combine with a modulation of the applied electric field, clearing the OASLM 20, 20' for the next frame.

During manufacture, the GaAs substrate 40 acts as an epitaxy seed, so it has the same lattice structure and coefficient of thermal expansion as the GaAs epitaxy that is grown on it, which in part later becomes the photoconducting layer 32 (with various precipitates in different portions to operate as the charge traps in the carrier confining layers 34a, 34b). The thickness of the GaAs epitaxy is determined by matching relative capacitances, impedances and/or resistances among the layers of device 20. Apart from acting as a mechanical stiffening agent and possibly the lower electrode, the GaAs substrate 40 in one embodiment in the finished product is inactive. Where the electrode is beneath the substrate 40 the substrate 40 itself is an electrical component in the system. Concentration of the arsenic precipitates (or other nodes acting as Schottky barriers) within the carrier confining layers 34a, 34b is determined by growth procedures to support high resolution of the device and sufficient trapping times for the electrons e⁻ and holes o⁺. The thickness of the light blocking layer 30 may be relatively thin when using any of Indium gallium arsenide InGaAs, AlGaAs or GaAs for that layer 30, because they have a very high absorption coefficient. The molar concentration of indium or aluminum in that layer 30 is optimized for the particular distributed Bragg reflector DBR 28 with which it functions in concert to form a filter.

Figure 4:
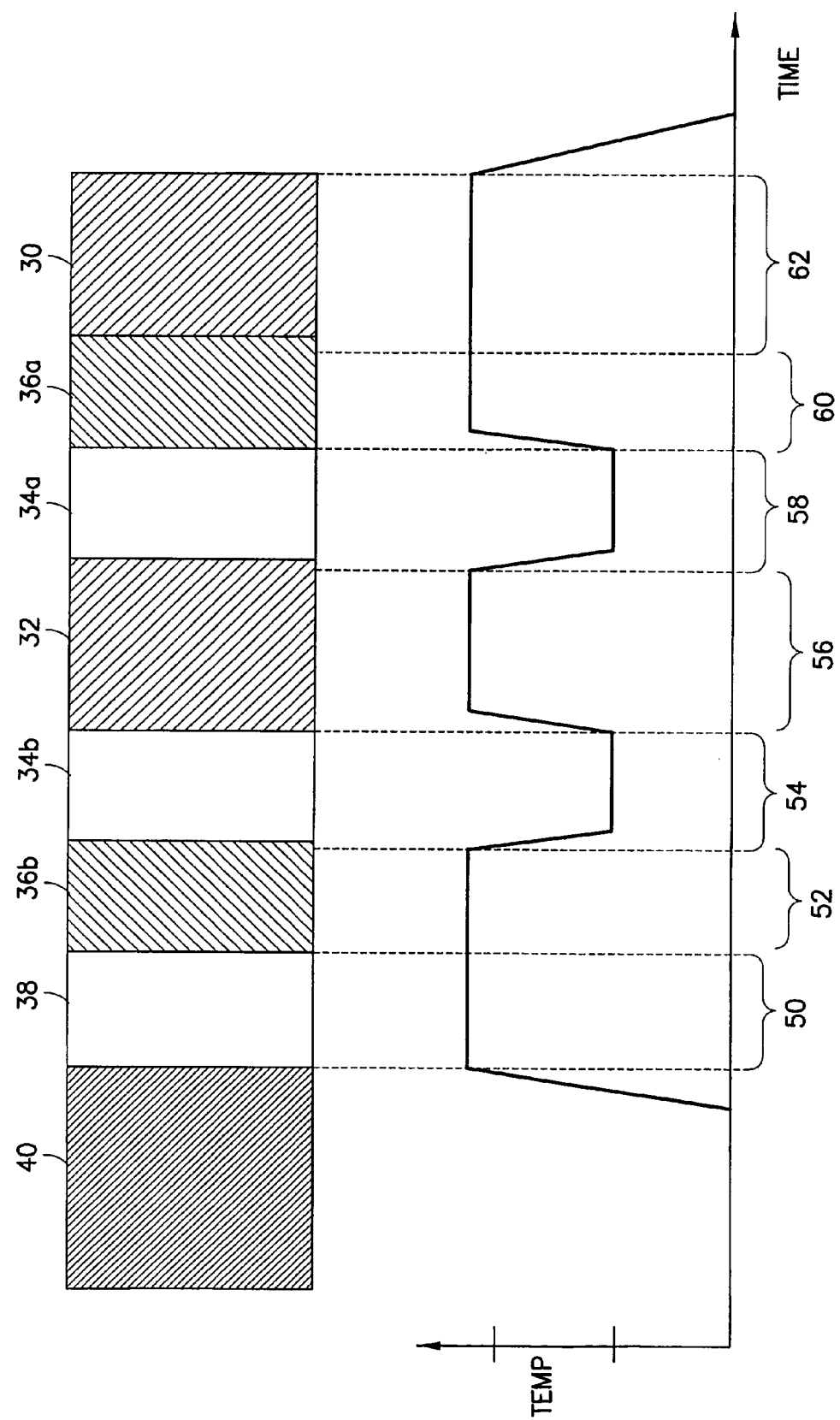
FIG. 4 is a time-versus temperature growth profile for several of the lower layers of the embodiment of FIG. 1A.

FIG. 4 more particularly details certain manufacturing efficiencies that might be attained in making a OASLM 20 according to embodiments of the invention. At the top of FIG. 4 are the lowermost eight layers described with reference to FIG. 1A, turned horizontal to match the time versus temperature growth profile shown at the lower portion of FIG. 4. The substrate 40 is a GaAs wafer from which other layers of FIG. 4 are grown. The temperature axis shows two temperatures, high and low, which in an embodiment represent 200-300 degrees C. and 500-600 degrees C., respectively. Time for growing each layer depends on the layer thickness desired, and FIG. 4 is not intended to be proportional in the time axis.

Temperature is raised to the higher temperature in region 50 to grow the lower electrode 38 as a layer of highly doped GaAs, AlGaAs or InGaAs, the latter two materials grown in the presence of a vapor containing Al or In respectively. The specific concentration of the dopant, such as Si or Be, within the vapor is selected so that the lower electrode 38 is electrically conductive. The second barrier layer 36b may be AlGaAs or AlAs, grown in region 52 at the higher temperature and is undoped so that the second barrier layer 36b is electrically insulating. Note that the arrangement of the electrode and barrier layers may be different as discussed above, specifically the electrode may be beneath the substrate and as such the barrier layer, if present at all, is between the electrode and the substrate.

Once the second barrier layer 36b is at or very near its desired thickness, temperature is lowered at region 54 as shown and the second carrier confining layer 34b is grown for example in one embodiment by Molecular Beam Epitaxy (MBE). As detailed above, upon annealing arsenic precipitates out from this layer grown at a lower growth temperature to form a layer of LTG-GaAs. Upon reaching the desired thickness for the second carrier confining layer 34b, the temperature is raised at region 56 to grow the photoconducting layer 32. While the undoped photoconducting layer 32 is being grown as GaAs or AlGaAs or InGaAs at the higher temperature, the second carrier confining layer 34b is being annealed as described above, and the arsenic precipitates form into spherical nodes that are nearly uniformly distributed throughout the volume of the second carrier confining layer 34b. Growth of the undoped photoconducting layer 32 continues after the anneal of the second carrier confining layer 34b is complete, as further time may be necessary for the thicker photoconducting layer 32 of exemplary embodiments of this invention. Further annealing the second carrier confining layer 34b does not adversely impact its properties.

As the photoconducting layer 32 reaches its desired thickness, the temperature is again dropped at region 58 to grow the first carrier confining layer 34a which upon annealing becomes LTG-GaAs, similar to the second carrier confining layer 34b described above. Temperature is again raised at region 60 to grow the first barrier layer 36a as AlGaAs or AlAs such that the first barrier layer 36a is electrically insulating. That raised temperature at region 60 anneals the first carrier confining layer 34a. Composition of the vapor in the MBE process is changed at region 62 to grow the light blocking layer 30 tuned to the specific parameters needed for its purpose, to block visible light as described above. As can be appreciated from the above, each layer through at least the first barrier layer 36a may be grown sequentially in a continuous process from the substrate 40, which acts as seed layer. The different layers are grown by varying certain parameters within that continuous process, such as vapor composition, and temperature, but the process is unitary and continuous, so therefore highly efficient from a manufacturing perspective. This is seen as a distinct advantage over the prior art, especially prior art rear-addressed light valves which require the very limiting constraint that the substrate be transmissive. Light valves made by the process detailed above are characterized in that the various layers formed from the same GaAs (or other substrate) epitaxy exhibit a lattice structure that is not discontinuous among the adjacent layers. For example, while a GaAs photoconducting layer 32 may differ in molecular structure from an adjacent LTG-GaAs carrier confining layer, the lattice structures of these distinct layers flow continuously one into the other. This is because those layers are grown in a single epitaxial growth process of materials of like lattice, though in order to define the distinct layers that process may vary by temperature, pressure, molar concentration of gas in the surrounding environment, etc. As detailed above, a non-discontinuous lattice structure may be evident from the substrate 40 to the light blocking layer 30 and all intervening layers, or from the substrate 40 to any of those intervening layers.

The DBR layer 28 may be considered a band pass or notch filter, passing only wavelengths within a certain band or energy range and substantially reflecting all energy/wavelengths above and below that band. As above, the light locking layer 30 is tuned to block specifically those wavelengths outside the wavelength-defined notch. As such, the pass band through the DBR layer 28 may be limited in both upper and lower wavelength ranges.

Figure 5:
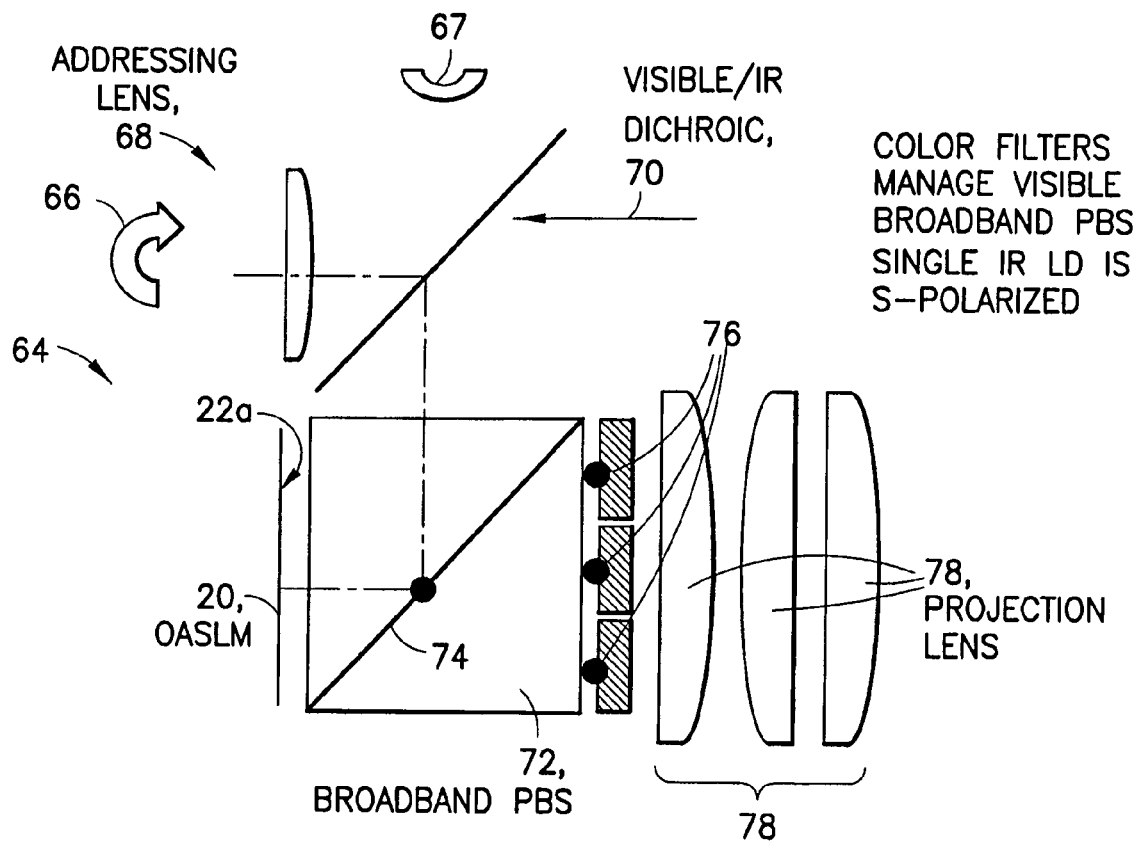
FIG. 5 is a schematic diagram of a single spatial light modulating valve in conjunction with an optical engine for together forming a projected image.

FIG. 5 illustrates one embodiment of a light engine 64 that uses an embodiment of an optically addressed spatial light modulator OASLM 20 such as that of FIG. 1A or the alternative embodiments detailed above. This particular embodiment uses a single OASLM 20 that processes visible light in three 'colors', where a distinct IR band of light addresses all three colors of visible light. A source 66 first provides addressing light in a single IR band that is focused at an addressing lens 68 and is reflected by a first dichroic mirror 70 to reach the broadband PBS 72. In an embodiment, the optics cause the addressing light to be S-polarized (or P-polarized) once it passes through the addressing lens 68. In another embodiment, the source 66 itself provides polarized addressing light.

The addressing light then passes into a broadband polarizing beamsplitter PBS cube 72 (or other shaped PBS component). Broadband PBS cubes are commercially available from the OptoSigma Corporation of Santa Ana, Calif., and various other manufacturers. The IR band addressing light is then reflected by the PBS 74 toward a front face 22a of the OASLM 20. As detailed above, the addressing light is converted to an image in layer 26 upon application of a variable applied electric field that reverses over a period less than a capture time defined by the first carrier confining layer 34a.

Figure 6:
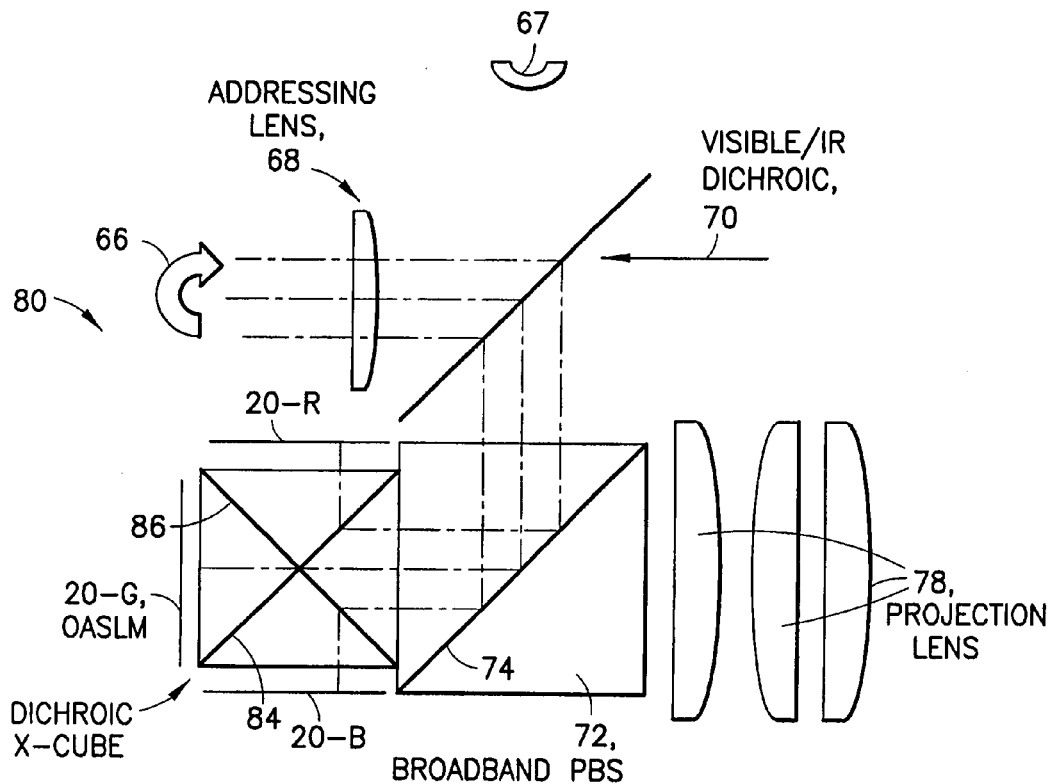
FIG. 6 is a schematic diagram of three spatial light modulating valves in conjunction with one type of optical engine for together forming a projected image.

Read light in the visible range is emitted from the source 67 (or from the same source as the IR addressing light source). In the embodiment of FIG. 6, the read light is white light encompassing the entire visible spectrum. The read light passes through optics and is polarized and then passes through the first dichroic mirror 70, and into the PBS cube 72 to be reflected by the PBS 74 toward the front face 22a of the OASLM 20. In the OASLM 20, the read light passes to the birefringent layer 26 where it is modulated, and is reflected by the DBR layer 28 (and somewhat by the light blocking layer 30) to pass out of the OASLM 20 at the front face 22a. The modulated read light then passes back into the PBS cube 72, through the polarizer 74, and through each of three separate color filters 76. Light which does not pass through the polarizer 74 is reflected back toward the source 67. Note that on the first pass toward the OASLM 20, the read light is reflected at the polarizer 74 but passes through it on the second or 'return' pass after the OASLM 20. This is because layer 26 (shown in FIG. 1A) changes the polarization state of the read light passing therethrough. The change in polarization causes the light to pass the polarizer 74 on the second pass. The polarization of the read light on the first pass may be set by the optics, or by a separate polarizing filter (e.g., component 46 of FIG. 1A). The color filters 76 manage the visible read light emanating from the OASLM 20, which then passes through a series of projection lenses 78 which throw the image onto a screen, such as a glass surface of a rear projection TV or a wall (or unrolled screen) if the light engine is part of a stand-alone projector that does not include an intrinsic projection screen.

Figure 7:
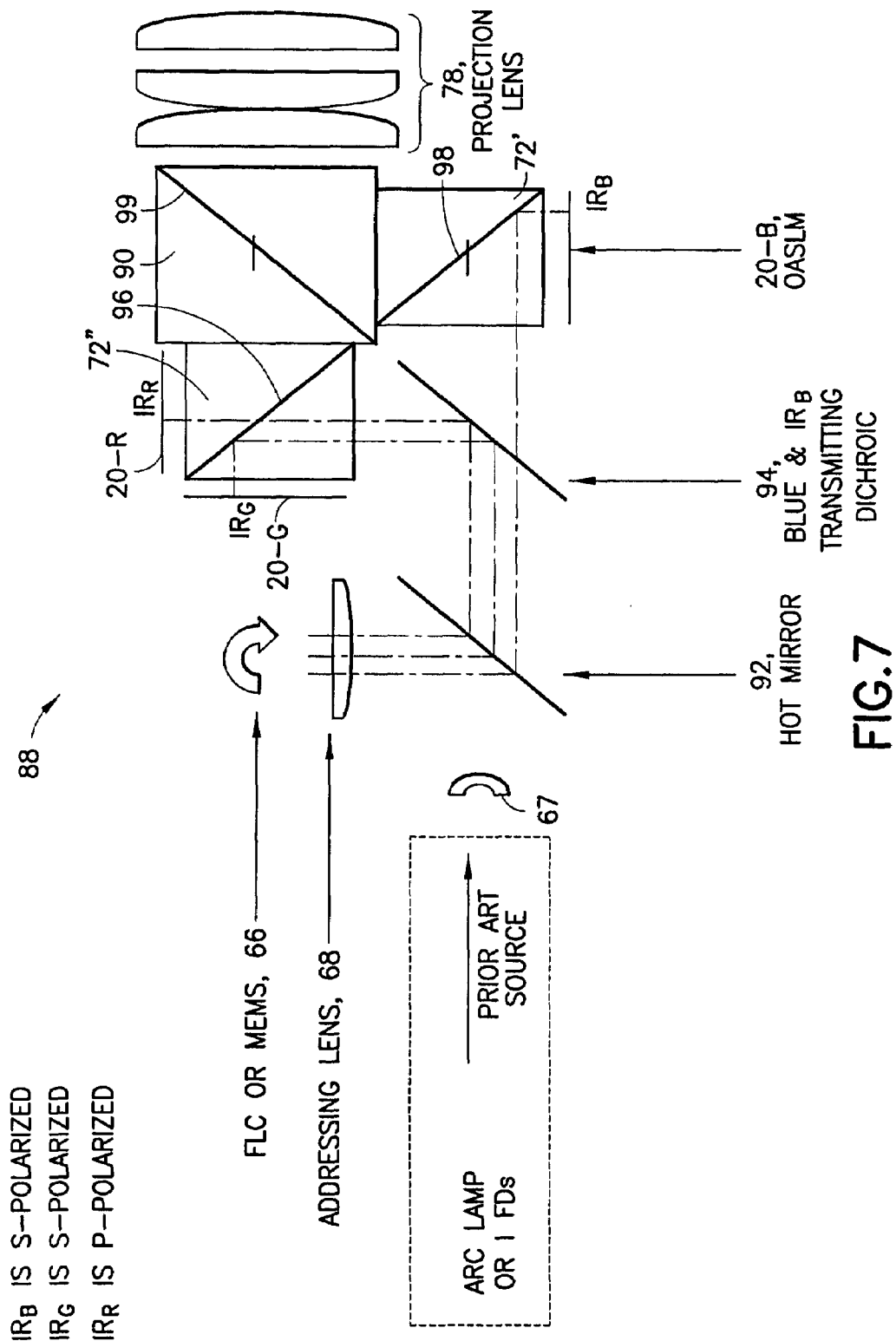
FIG. 7 is a schematic diagram of three spatial light modulating valves in conjunction with another type of optical engine for together forming a projected image, and also showing a prior art arc-lamp source overlain for comparison purposes.

FIG. 5 is seen as a lower cost embodiment as compared to FIGS. 6-7, since of those embodiments only FIG. 5 uses a single OASLM 20.

FIG. 6 illustrates an embodiment of a light engine 80 that uses three distinct-color light valves 20-R, 20-G, and 20-B (for red, green and blue, respectively) about a PBS/x-cube arrangement. The addressing light source 66, addressing lens 68, first dichroic mirror 70, PBS cube 72, and second polarizer 74 are similar in principal to those same components described with respect to FIG. 5, except that in FIG. 6, the addressing light is shown in three distinct IR bands. These IR addressing light bands may emanate from a single source 66 or from multiple sources, as those IR addressing light bands are divided by the dichroic x-cube 82, of which an exemplary embodiment is also available from the OptoSigma Corporation of Santa Ana, Calif. The source 66 may provide addressing light and read light, or read light may be provided by a separate source 67. In either instance, the addressing light passes through the addressing lens 68 in order to be properly imaged on the OASLM 20.

Specifically, as compared to the embodiment of FIG. 5, the embodiment of FIG. 6 disposes a dichroic x-cube 82 between the PBS 72 and the OASLM 20, and rather than a single OASLM 20, one color-specific OASLM 20-R, 20-G, 20-B is disposed adjacent to each of the remaining sides of the dichroic x-cube not adjacent to the PBS 72. Within the x-cube 82 are first and second cross-dichroic mirrors 84 and 86, respectively. The reflectance and pass characteristics of the first and second cross-dichroic mirrors 84, 86 are such that the first cross-dichroic mirror 84 passes $IR_R$ addressing light of S-polarization, reflects $IR_R$ addressing light of S-polarization, and passes red read (visible) light of both S and P polarization but reflects blue read (visible) light of either polarization. The second cross-dichroic mirror 86 passes $IR_B$ addressing light of S-polarization reflects $IR_R$ addressing light of S-polarization, and passes blue read (visible) light of both S and P polarization but reflects red read (visible) light of either polarization. Both the first and second cross-dichroic mirrors 84, 86 also pass $IR_G$ addressing light of S-polarization and pass green read (visible) light of both S and P polarizations. Of course, the above assumes that the initial polarization of light into the PBS 72 is S-polarized; the polarizations above are reversed if the initial polarization is P with the read light switched to S-polarization within the various light valves 20-R, 20-G, and 20-B.

The end result is shown in FIG. 6: addressing light of the $IR_R$ band is essentially passed only to the OASLM 20-R that is sensitive to (tuned to) that band of addressing light. The DBR layer 28 and light blocking layer 30 of that particular OASLM 20-R are designed to block light outside the $IR_R$ range, including visible light, $IR_G$ and $IR_B$. When read light in the visible red band and of a first polarization (e.g., S) passes through the x-cube 82, it is reflected from the second dichroic mirror 86 and passes through the first dichroic mirror 84 to enter the red-tuned OASLM 20-R. That read light, in the red visible band, is changed in polarization state to a second polarization state within the OASLM 20-R, exits into the x-cube 82, is reflected from the second cross dichroic mirror 86 and passes through the first cross-dichroic mirror 84, and continues in a second pass through the polarizer 74 of the PBS 72 and out toward the projecting lenses 78 (that red light that does not pass through the polarizer 74 is reflected by it and eventually trapped at the source 67). The remaining two light valves 20-G and 20-B operate similarly, with the various cross-dichroic filters 84, 86 and polarizations operating to selectively pass and reflect light within the appropriate write and read bands into and out of the select light valve.

FIG. 7 is an illustration of a particularly advantageous light engine 88 using three color-distinct light valves 20-R, 20-G, 20-B about two different PBS cubes 72', 72" and an integrating PBS cube 90. The embodiment of FIG. 7 represents an adaptation of a prior art optical engine, commonly termed "Colorlink® technology" or similar, to forward addressed OASLMs 20-R, 20-G, 20B according to embodiments of this invention. A source 66, addressing lens 68, and projection lens 78 are similar to those described with reference to FIG. 5. IR addressing light in three IR bands emanates from a singular source or multiple sources 66 (that may be contemporaneous with 67) that may be polarizing with the IR light passing through an addressing lens. Visible read light emanates from a singular source or multiple sources 67. One or more polarizing filters may be disposed along the illustrated optical pathways so that the $IR_R$ is polarized differently than the $IR_G$ and $IR_B$ addressing light. In this description, $IR_R$ is P-polarized and $IR_G$ and $IR_B$ are each S-polarized, but those conventions may be readily reversed. Alternatively but not specifically illustrated, the different wavelength bands of addressing light entering from the left of FIG. 7 may all exhibit the same polarization state, and a dichroic filter may be disposed in front of the polarizer 96 to enable this or the Colorlink® filters can be modified accordingly. In other embodiments, there need be no polarization of the different addressing light streams. A hot mirror 92 directs all IR and visible light within the bands of interest to a blue-transmitting dichroic mirror 94. The positions of 20-R, 20-G, 20-B can be varied and as such the descriptions of the light paths will vary accordingly; the specific disposition shown in FIG. 7 is illustrative and exemplary, not exhaustive.

IR addressing light $IR_B$ corresponding to visible blue read light passes through dichroic mirror 94 toward a blue-oriented polarizer 72' and reflects off of polarizer 98 of PBS 72' to enter the blue-tuned OASLM 20-B. Read light in the visible blue range passes the same optical pathway, where portions may be changed to P-polarization within the OASLM 20-B, and passes out of the OASLM 20-B, through the blue-oriented PBS 72' and into the integrating PBS cube 90. Similarly, IR addressing light $IR_G$ and $IR_R$ corresponding to visible green and red read light (respectively) is reflected from the blue-transmitting dichroic mirror 94 and passes into a red and green-oriented PBS 72". Within that PBS 72", the $IR_R$ addressing light passes an $IR_R/IR_G$ oriented dichroic mirror in front of the polarizer of 96 and enters a red-tuned OASLM 20-R. Read light in the visible red range passes the same optical pathway as described for $IR_R$, is changed to P-polarization within the OASLM 20-R to pass out of the OASLM 20-R, and is reflected by the red/green-oriented dichroic mirror 96 toward the integrating PBS cube 90. Within that same PBS 72", the $IR_G$ addressing light is reflected from the red/green oriented dicliroic mirror 96 and enters a green-tuned OASLM 20-G. Read light in the visible green range passes the same optical pathway as described for $IR_6$, is changed to P-polarization within the OASLM 20-G to pass out of the OASLM 20-R, and passes through the red/green-oriented dichroic mirror 96 toward the integrating PBS cube 90.

At this point, all three of the read light colors, red, green and blue, are present within the integrating PBS 90. Blue is reflected from the integrating PBS 99 while red and green pass through it, and all three colors as modulated by the separate light valves 20-R, 20-G and 20-B pass through the projection lens 78 together for a multi-color image projection. Advantages over prior-art Colorlink® technology light engines are as follows.

For LED illuminated read light, power and therefore heat are greatly reduced in the embodiment of FIG. 7. Whereas prior art Colorlink® technology uses typically an arc lamp as shown in the block encircled by the dashed line (and its associated very high energy usage and heat generation). The embodiment of FIG. 7 may use an IR laser diode, LED or other source along with a micro-electrical mechanical system (MEMS), or even a ferro-electric liquid crystal (FLC) device or nematic liquid crystal (NLC) device as the addressing light source 66 that operates on a scale of about 50 microwatts per square centimeter of the OASLM 20. This addressing light modification is not present in LCoS implementations of the Colorlink® technology. Heat generation has become such a concern in current projector technology that consumers are often given average bulb time in order to compare and contrast different projectors, including rear-projection televisions.

Second, Colorlink® technology of the prior art imposes great difficulty in aligning the three different color images prior to the projection lens. The embodiments of FIGS. 7 and 7 do not suffer from the need for a separate alignment regimen for the different images because they all derive from the same addressing light source yielding exact pixel alignment. Aligning the various color-specific images is merely a matter of equalizing the different optical paths between the source 66 and the projection lens 78, a fairly straightforward process for which accuracies beyond what is sensible by the human eye are readily achieved.

Figure 8:
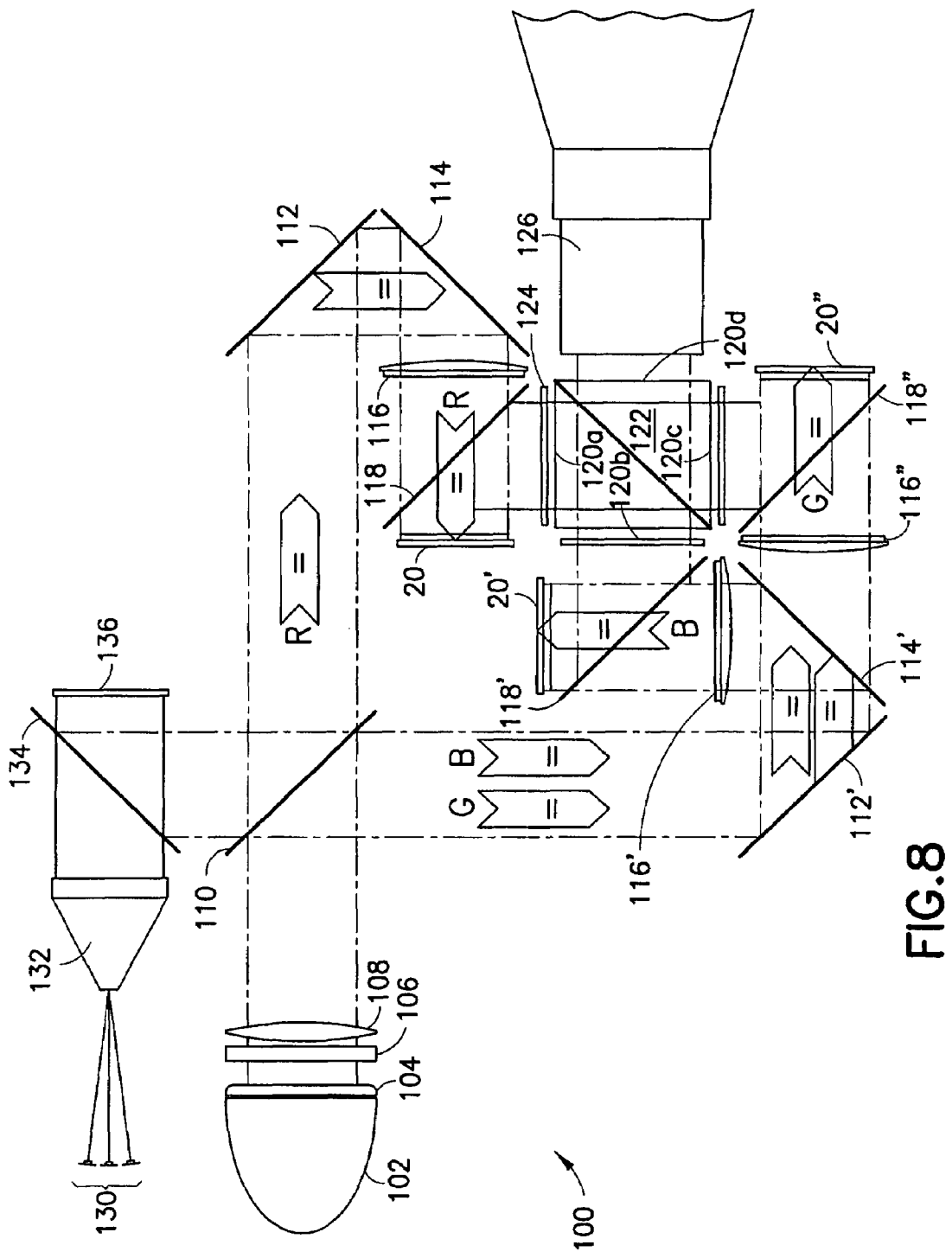
FIG. 8 is another embodiment of an optical engine configured to employ an OASLM according to these teachings.

FIG. 8 illustrates another optical engine 100 configured for use with the OASLM embodiments described above. A light source 102 such as an arc lamp or LED outputs to a series of two fly's eye lenses 104, 106 and a relay lens 108 and is split at a dichroic splitter or dichroic filter 110 into red, green and blue bands (shown respectively as R, G and B). The pathway of the red band will be detailed; those of the blue and green bands are similar in concept. The red band light is reflected by a pair of turning mirrors or turning dichroics 112, 114 through another relay lens 116 and through a polarizer 118 disposed for convenience at a 45 degree angle to the optical pathway. By example, the polarizer 118 may be known as a wired grid polarizer (e.g., available from Moxtek®), a thin film polarizer (e.g., available from McNeil®), or a polarizing beam splitter (e.g., such as a Viquiti® splitter available from 3M®). The red band passes through straight through the polarizer 118 and into the OASLM 20 light valve such as those detailed at FIGS. 1A-C. Output light from that OASLM 20 reflects from the polarizer 118 toward one input side 120a of an X-cube 122, preferably through a clean-up polarizer 124. Green and blue bands follow similar pathways, with similar components for those pathways labeled in FIG. 8 with a prime for blue and double prime for green (with the exception of the turning mirrors 112', 114', through which pass both blue and green bands). Blue light enters a second input side 120b of the X-cube 122, and green light enters a third input side 120c of the X-cube 122. The red, blue and green bands are combined in the X-cube 122 and pass through an output side 120d into output or projection optics arrangement 126.

Also in FIG. 8 is shown apparatus for addressing optics, termed above as write light. A write light source 130 is shown as three LEDs, each outputting infrared write light in a different band for red, blue and green. The infrared source light passes through a beam expander 132 and a polarizer 134 (or optionally a beam steerer if polarized light is not used) and into a write light modulator 136. Modulated write light is output from the modulator 136 and redirected at the polarizer 134 toward the dichroic splitter 10 previously detailed.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope and spirit of the invention as set forth above, or from the scope of the ensuing claims. Where the claims recite a layer disposed 'over' or 'under' another layer, that relation describes a relative disposition and is not to imply the layers are necessarily adjacent to one another; a layer being disposed over another layer does not preclude one or more intervening layers therebetween.

What is claimed is:

1. An optical device comprising:
   a first electrode layer;
   an electrically insulating first barrier layer disposed over the first electrode layer;
   a photoconductive layer disposed over the first barrier layer;
   a carrier confining layer disposed over the photoconducting layer, said carrier confining layer defining a volume and comprising a plurality of carrier traps dispersed throughout the volume;
   an electrically insulating second barrier layer disposed over the carrier confining layer;
   a light blocking layer disposed over the second barrier layer for blocking light of a selected wavelength band;
   a reflective layer disposed over the light blocking layer for reflecting light within the selected wavelength band;
   a birefringent or dispersive layer disposed over the reflective layer; and
   an optically transmissive second electrode layer disposed over the birefringent or dispersive layer.

2. The optical device of claim 1, further comprising:
   a voltage source coupled to the first and second electrode layers; and a switch for reversing an applied electric field imposed by the voltage source across the first and second electrode layers at a frequency X;
   wherein the carrier confining layer is characterized in that it traps a substantial majority of charge carriers of a first type for a period of time at least 1/X.

3. The optical device of claim 2, wherein the carrier confining layer is characterized in that it traps charge carriers of a first type for a period of time at least 1/X while a forward applied electric field is applied across the first and second electrode layers, and that it traps charge carriers of a second type for a period of time at least 1/X while a reverse applied electric field is applied across the first and second electrode layers.

4. The optical device of claim 1, wherein said first electrode layer is substantially opaque.

5. The optical device of claim 1, wherein the said carrier confining layer is a first carrier confining layer, the optical device further comprising a second carrier confining layer between the first barrier layer and the photoconductive layer.

6. The optical device of claim 1, further comprising:
   at least one alignment layer disposed adjacent to the birefringent or dispersive layer.

7. The optical device of claim 1, wherein the photoconducting layer comprises gallium arsenide and the carrier confining layer comprises at least one of gallium arsenide, AlGaAs or InGaAs with arsenic precipitates dispersed therethrough.

8. The optical device of claim 7, wherein the carrier confining layer defines a thickness such that the carrier confining layer is not optically active.

9. The optical device of claim 1, wherein the reflective layer comprises a distributed Bragg reflector made from alternating sub-layers of materials having different indices of refraction.

10. The optical device of claim 9, wherein the reflective layer comprises a first distributed Bragg reflector layer, the optical device further comprising a second distributed Bragg reflector layer disposed between the second barrier layer and the light blocking layer.

11. The optical device of claim 1 in combination with a source of infrared addressing light and a polarizing filter disposed between the optical device and the source, said polarizing filter physically spaced from the optical device.

12. The optical device of claim 1 in combination with a light engine disposed between the optical device and a light source, such that read and addressing light from the source passes along a first optical pathway through the light engine and into the optical device through the optically transmissive second electrode layer, and read light passes out of the optical device through the optically transmissive second electrode layer and through the light engine along a second optical pathway.

13. The optical device of claim 12, wherein the light engine comprises at least one dichroic mirror disposed along the first and second optical pathways, and the optical device rotates a polarization of the read light to change its pathway through the light engine from the first to the second optical pathway.

14. The optical device of claim 12, wherein the selected wavelength band is within the visible spectrum, and further wherein the addressing light comprises infrared light and the read light comprises visible light.

15. The optical device of claim 1 wherein the first barrier layer comprises a wafer.

16. The optical device of claim 1 further comprising a wafer disposed between either the first electrode layer and the first barrier layer, or disposed between the first barrier layer and the photoconductive layer.

17. The optical device of claim 1 further comprising a wafer disposed between the first electrode layer and the first barrier layer, and further comprising at least one of a third barrier layer and a dielectric layer disposed between the wafer and the first electrode layer.

18. A method for making a multi-layered optical device comprising:
   providing a first conductive layer;
   growing a gallium arsenide GaAs layer over the first conductive layer at a temperature less than about 425 degrees C.;
   disposing an electrically insulating layer over the GaAs layer;
   disposing a photoconducting layer over the electrically insulating layer;
   disposing a light blocking layer over the photoconducting layer that blocks light of a selected wavelength band;
   disposing a reflective layer over the light blocking layer that reflects light of the selected wavelength band;
   disposing a birefringent layer or a dispersive layer over the reflective layer; and
   disposing an optically transmissive second conductive layer over the birefringent or dispersive layer.

19. The method of claim 18, further comprising:
   coupling the first conductive layer to the optically transmissive second conductive layer through an electrical switch that is operable to reverse an electric field applied across the conductive layers.

20. The method of claim 18, wherein growing the GaAs layer comprises growing it to a thickness between about 5 and 20 nm.

21. The method of claim 18, wherein growing the GaAs layer comprises growing it at a temperature between about 200-300 degrees C.

22. The method of claim 18, wherein growing the GaAs layer further comprises annealing the GaAs layer at a temperature higher between about 500-700 degrees C.

23. The method of claim 22, wherein annealing the GaAs layer comprises annealing for no longer than about twenty minutes.

24. The method of claim 18, wherein the GaAs layer comprises at least one of AlGaAs or InGaAs.

25. The method of claim 24, wherein the GaAs layer is graded across a thickness dimension in concentration of the Al or As.

26. The method of claim 18, wherein the photoconducting layer comprises GaAs that varies across its thickness between in molar fraction of Al and In.

27. The method of claim 18, wherein the photoconducting layer comprises a thickness between about 100 nm and less than about 10 microns.

28. The method of claim 18, wherein the light blocking layer is optically invariant to an electrical field applied across it.

29. The method of claim 18, wherein the selected wavelength band is visible light and the reflective layer passes infrared light.

30. The method of claim 29, wherein the reflective layer comprises a band pass notch filter.

31. The method of claim 29, wherein the reflective layer comprises alternating layers of arsenide and/or oxide compounds.

* * * * *